(12) United States Patent
Ahn et al.

(10) Patent No.: US 12,517,151 B2
(45) Date of Patent: Jan. 6, 2026

(54) ELECTRICALLY CONDUCTIVE CONTACT PIN AND MANUFACTURING METHOD THEREFOR

(71) Applicant: POINT ENGINEERING CO., LTD., Chungcheongnam-do (KR)

(72) Inventors: Bum Mo Ahn, Gyeonggi-do (KR); Seung Ho Park, Gyeonggi-do (KR); Sung Hyun Byun, Gyeonggi-do (KR)

(73) Assignee: POINT ENGINEERING CO., LTD., Chungcheongnam-do (KR)

( * ) Notice: Subject to any disclaimer, the term of this patent is extended or adjusted under 35 U.S.C. 154(b) by 157 days.

(21) Appl. No.: 18/285,384

(22) PCT Filed: Apr. 7, 2022

(86) PCT No.: PCT/KR2022/005060
§ 371 (c)(1),
(2) Date: Oct. 3, 2023

(87) PCT Pub. No.: WO2022/216090
PCT Pub. Date: Oct. 13, 2022

(65) Prior Publication Data
US 2024/0183881 A1   Jun. 6, 2024

(30) Foreign Application Priority Data
Apr. 9, 2021   (KR) .................. 10-2021-0046366

(51) Int. Cl.
*G01R 1/067*   (2006.01)
*G01R 3/00*   (2006.01)

(52) U.S. Cl.
CPC ..... *G01R 1/06761* (2013.01); *G01R 1/06738* (2013.01); *G01R 3/00* (2013.01)

(58) Field of Classification Search
None
See application file for complete search history.

(56) References Cited

U.S. PATENT DOCUMENTS

| | | | |
|---|---|---|---|
| 7,265,565 B2* | 9/2007 | Chen .................. | G01R 1/06738 324/755.07 |
| 7,504,839 B2* | 3/2009 | Feigenbaum ...... | G01R 1/07342 324/755.01 |

(Continued)

FOREIGN PATENT DOCUMENTS

| | | |
|---|---|---|
| JP | H0629764 | 4/1994 |
| JP | 6029764 | 11/2016 |

(Continued)

OTHER PUBLICATIONS

Lin, et al., Challenges to Fabricate Large Size-Controllable Submicron-Structured Anodic-Aluminum-Oxide Film, Atlas Journal of Material Science 2 (2): 65-72, 2015 teaches a mold made of anodic aluminum oxide film. (Year: 2015).*

(Continued)

*Primary Examiner* — Rodney E Fuller
(74) *Attorney, Agent, or Firm* — JCIPRNET

(57) ABSTRACT

Proposed are an electrically conductive contact pin formed by stacking a plurality of metal layers and a manufacturing method therefor, in which unintentional deformation of the electrically conductive contact pin is prevented by concentrating a pressing force pressing the electrically conductive contact pin on a tip portion having a relatively small cross-sectional area.

13 Claims, 32 Drawing Sheets

(56) References Cited

U.S. PATENT DOCUMENTS

| | | | | |
|---|---|---|---|---|
| 7,629,807 | B2* | 12/2009 | Hirakawa | G01R 1/06727 324/755.07 |
| 12,146,898 | B2* | 11/2024 | Veeramani | G01R 1/06722 |
| 2008/0111573 | A1* | 5/2008 | Chen | G01R 1/06722 324/755.05 |
| 2009/0160473 | A1* | 6/2009 | Fukami | G01R 1/06727 29/874 |
| 2012/0064227 | A1* | 3/2012 | Chen | G01R 3/00 205/78 |
| 2015/0280345 | A1* | 10/2015 | Kimura | G01R 1/07357 439/700 |
| 2024/0097390 | A1* | 3/2024 | Frodis | G01R 1/067 |

FOREIGN PATENT DOCUMENTS

| | | | |
|---|---|---|---|
| KR | 100449308 | | 9/2004 |
| KR | 20090113394 | | 11/2009 |
| KR | 20090113394 | A * | 11/2009 |
| KR | 101042513 | | 6/2011 |
| KR | 101178237 | | 8/2012 |
| KR | 20150092094 | | 8/2015 |
| KR | 20160030536 | | 3/2016 |
| KR | 20170061314 | | 6/2017 |
| KR | 101766261 | | 8/2017 |
| KR | 20170107465 | | 9/2017 |
| KR | 20170128352 | | 11/2017 |
| KR | 20190117015 | | 10/2019 |
| KR | 20200100700 | | 8/2020 |

OTHER PUBLICATIONS

"International Search Report (Form PCT/ISA/210) of PCT/KR2022/005060", mailed on Jul. 14, 2022, with English translation thereof, pp. 1-8.

"Request for the Submission of an Opinion of Korea Counterpart Application", issued on Dec. 13, 2022, with English translation thereof, pp. 1-16.

"Written Decision of Registration of Korea Counterpart Application", issued on Jun. 7, 2023, with English translation thereof, pp. 1-10.

"Office Action of Korea Counterpart Application", issued on Sep. 26, 2023, with English translation thereof, p. 1-p. 8.

* cited by examiner

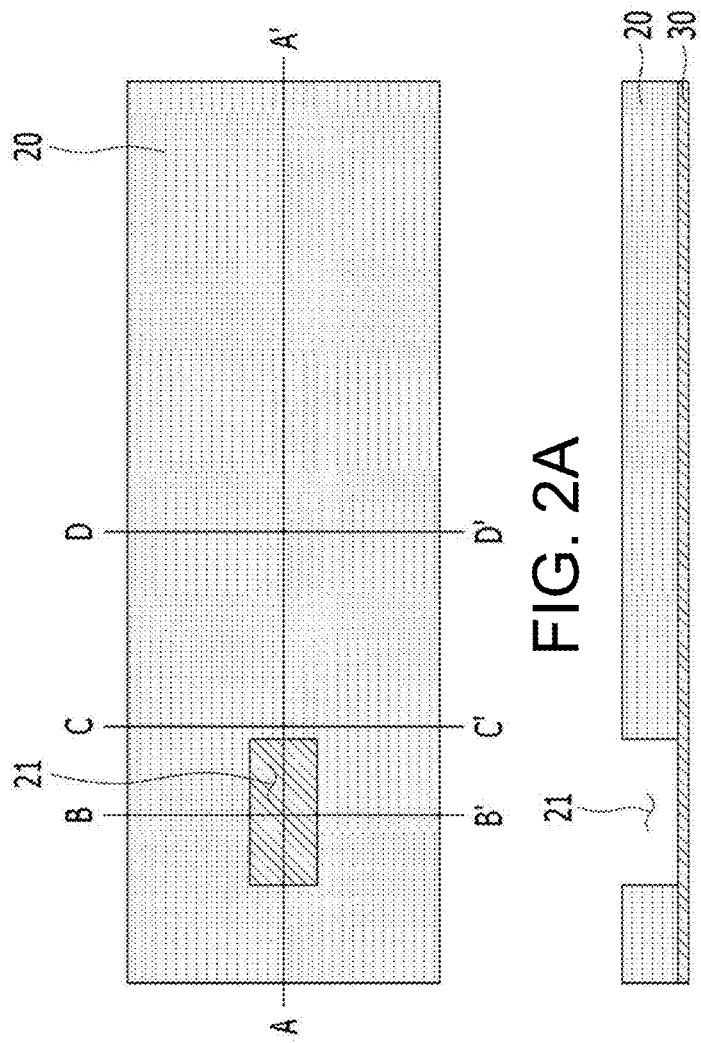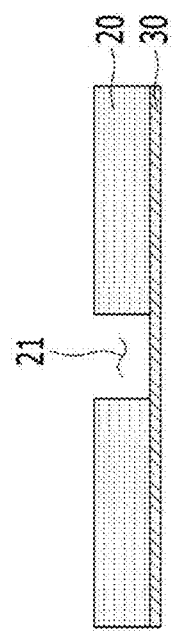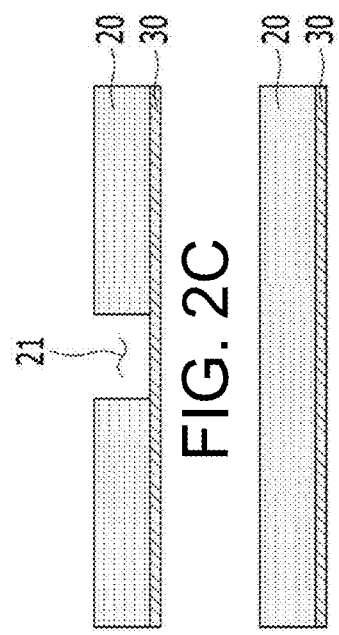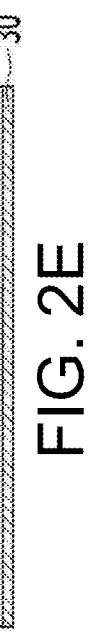

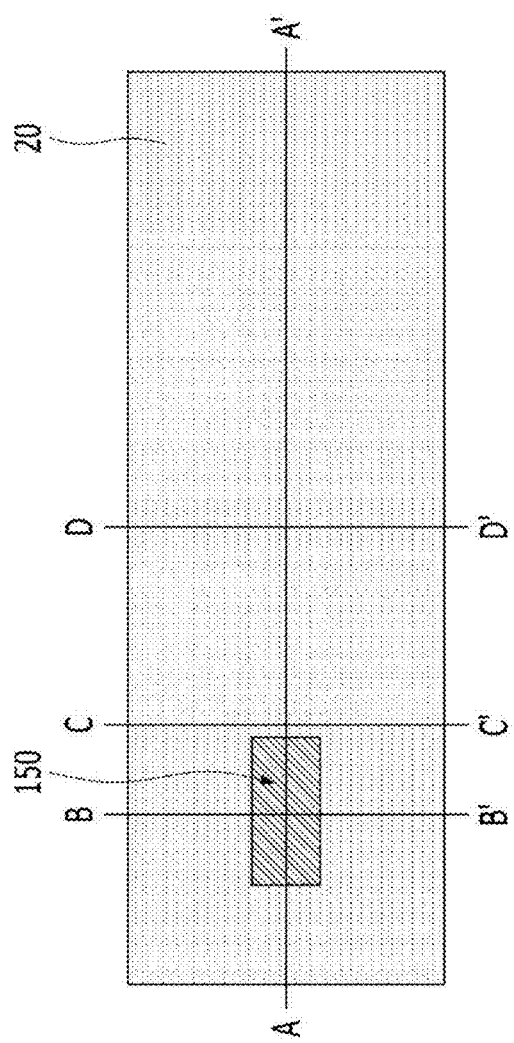
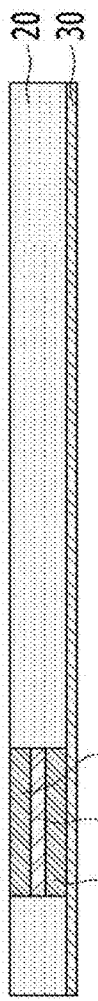
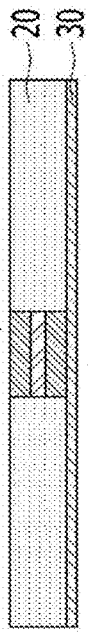
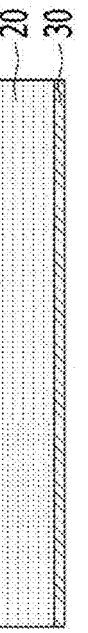
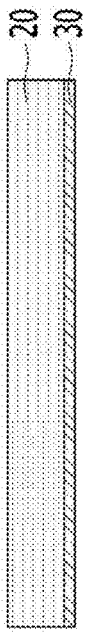
FIG. 3A
FIG. 3B
FIG. 3C
FIG. 3D
FIG. 3E

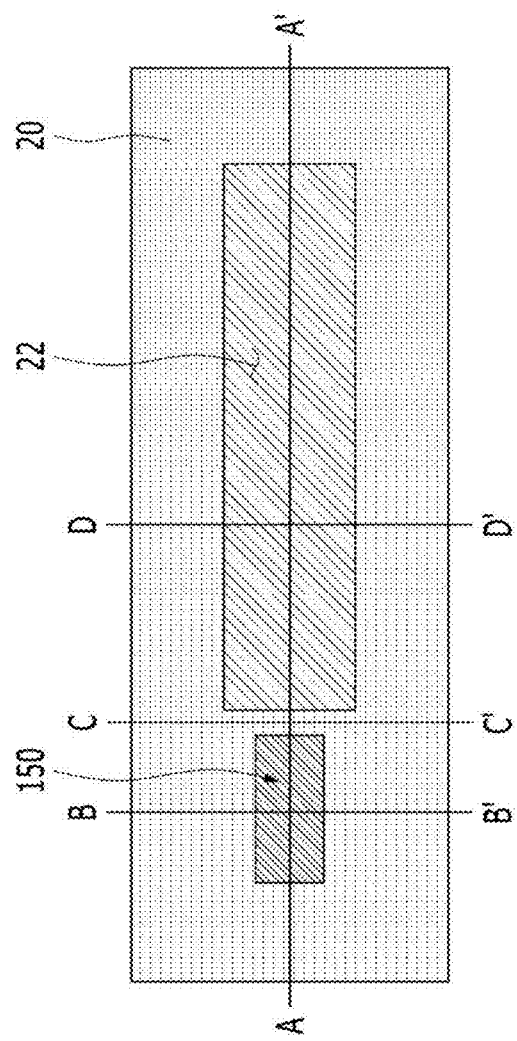
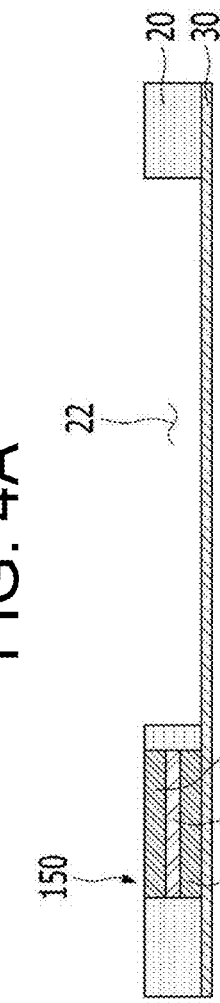
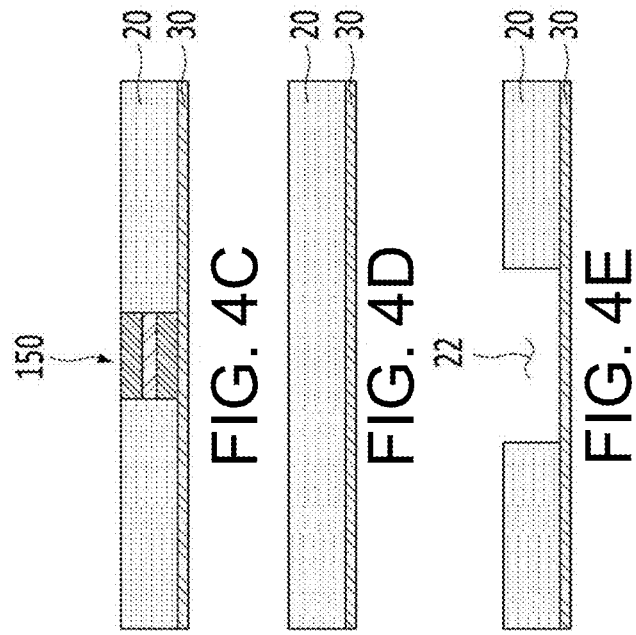
FIG. 4A
FIG. 4B
FIG. 4C
FIG. 4D
FIG. 4E

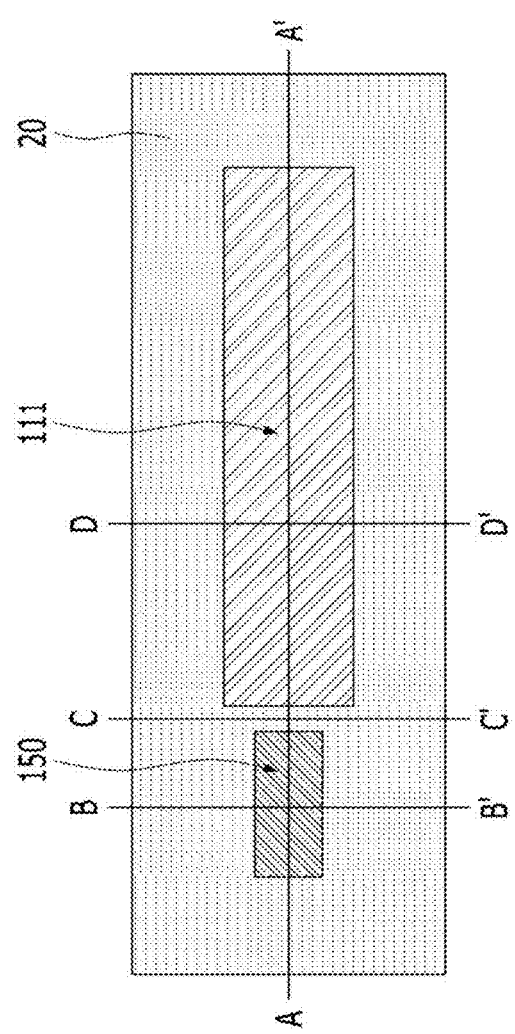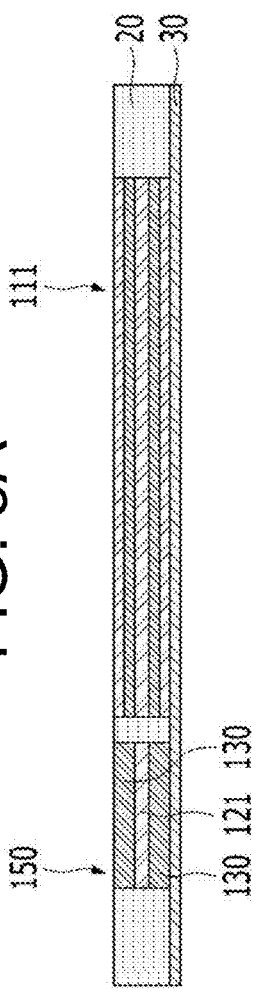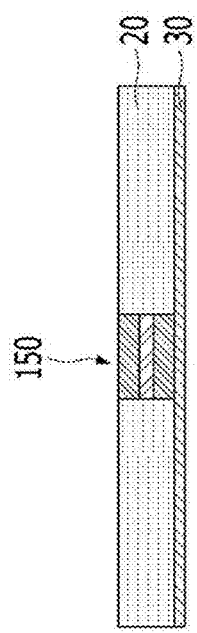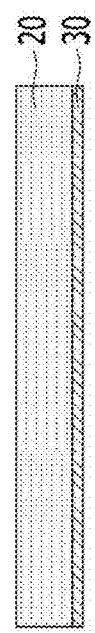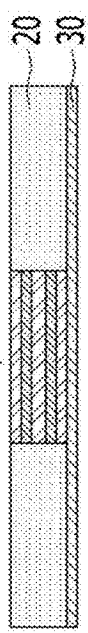

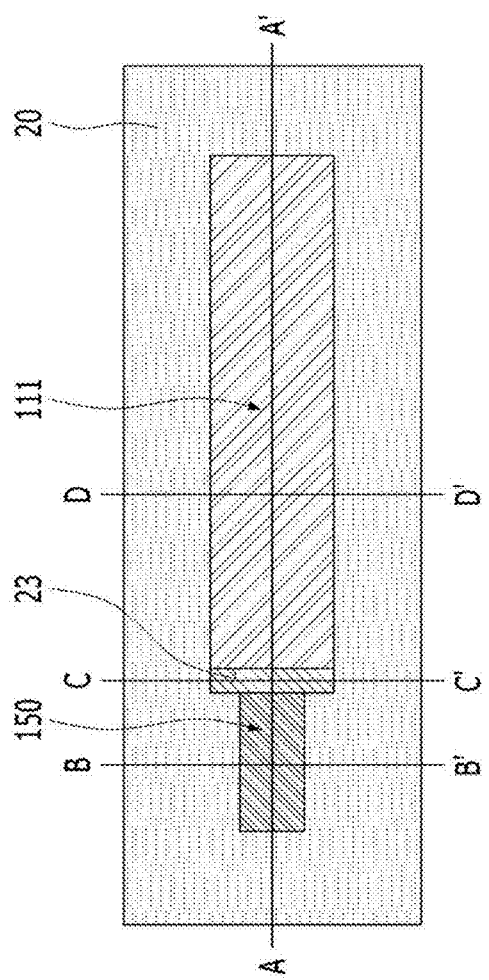
FIG. 6A
FIG. 6B
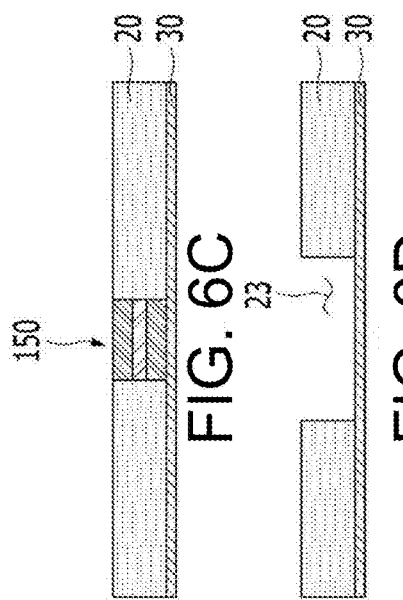
FIG. 6C
FIG. 6D
FIG. 6E

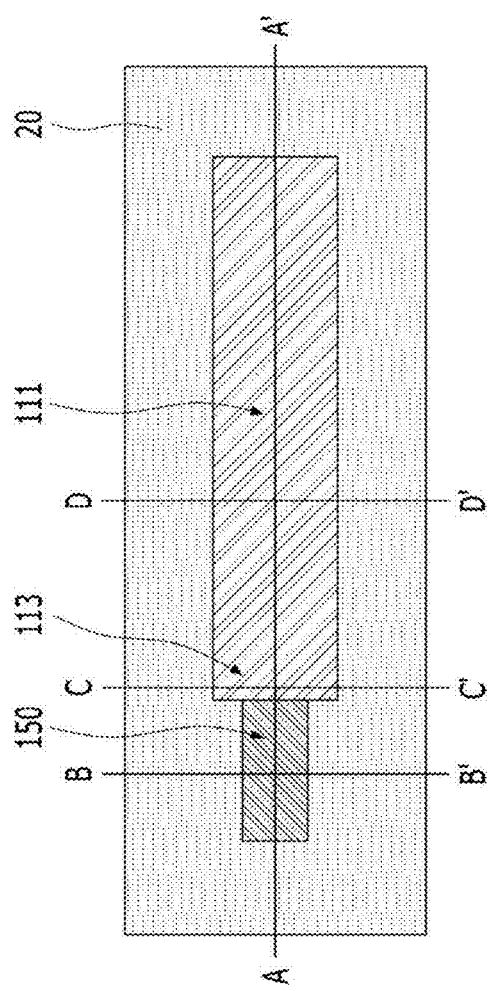
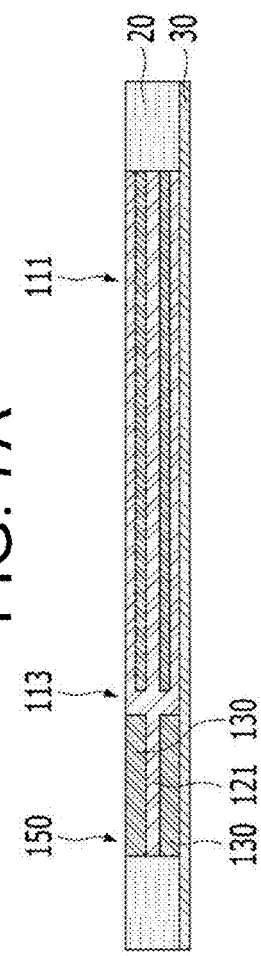
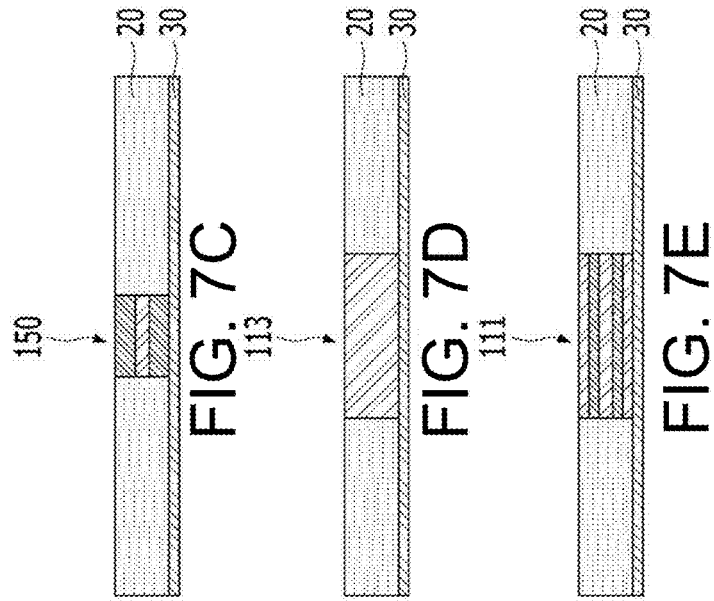
FIG. 7A
FIG. 7B
FIG. 7C
FIG. 7D
FIG. 7E

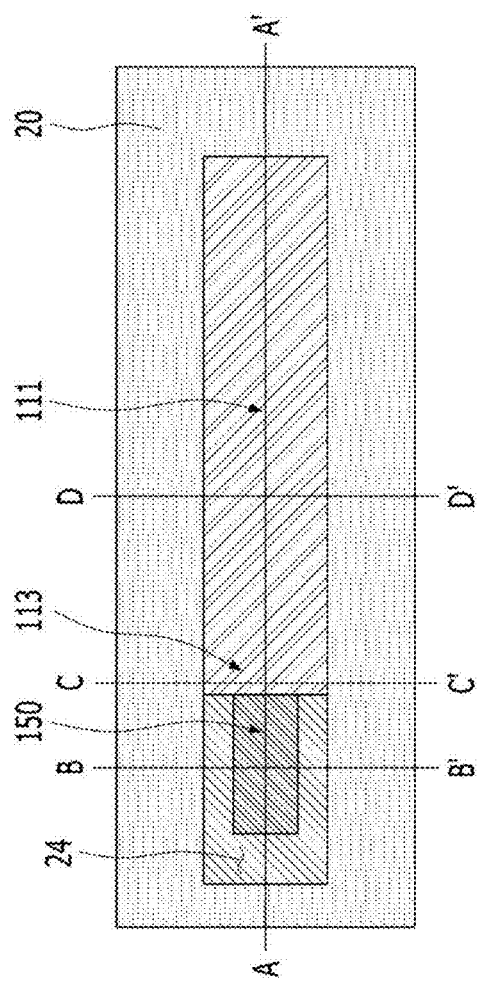
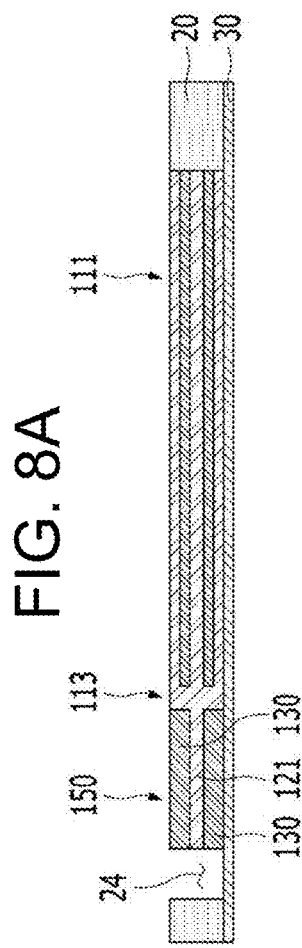
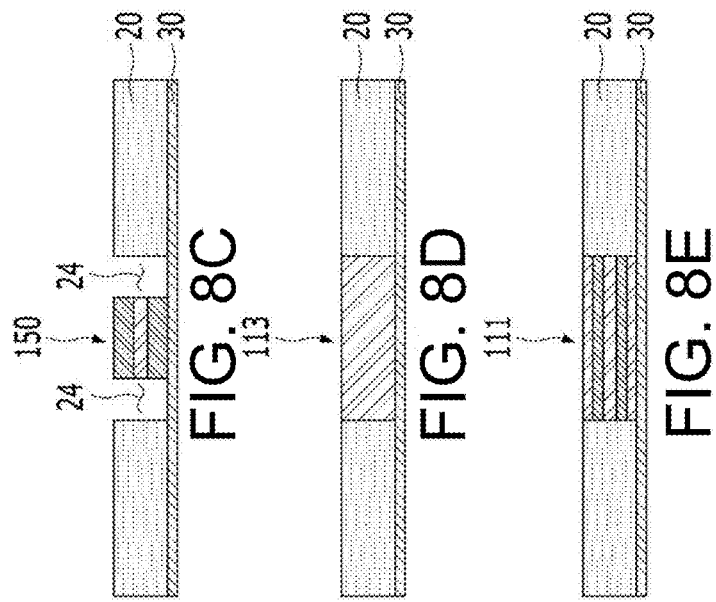

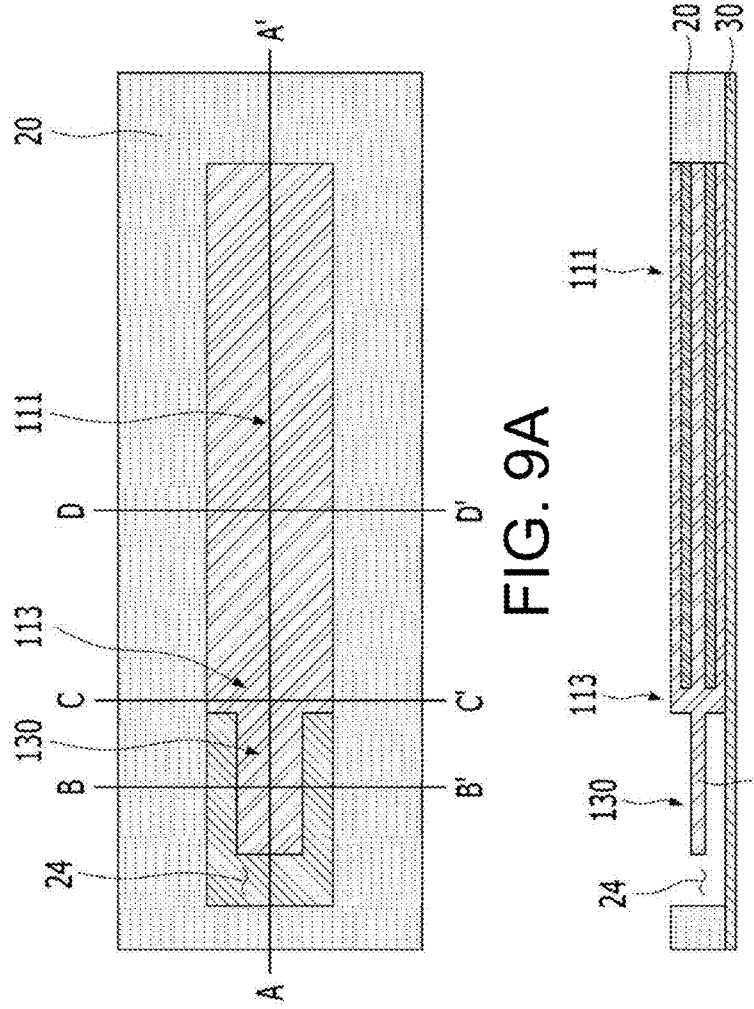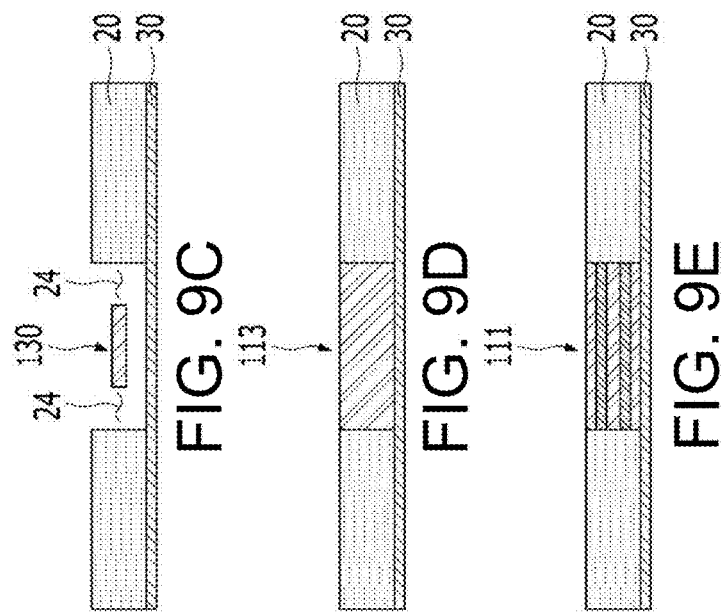

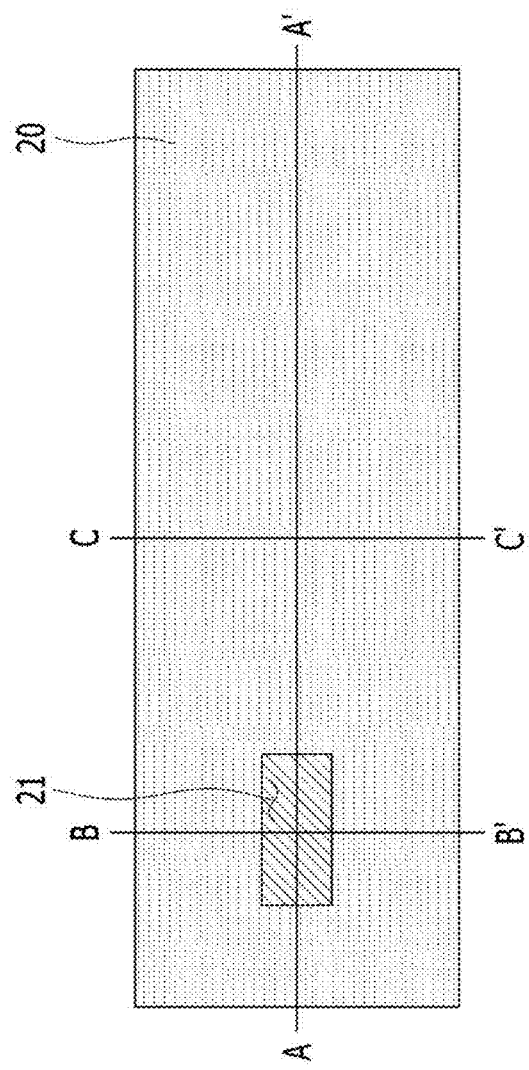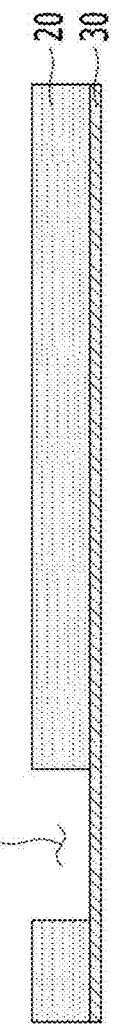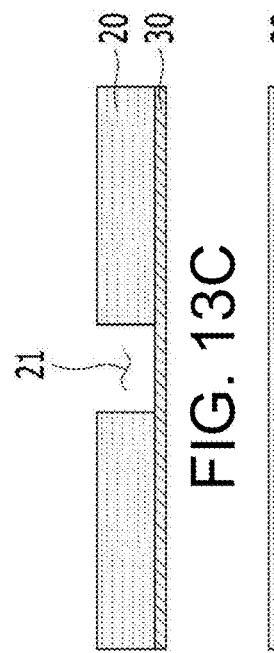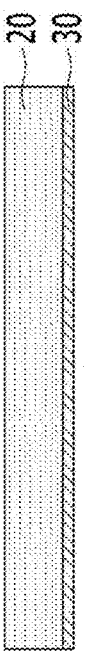
FIG. 13A
FIG. 13B
FIG. 13C
FIG. 13D

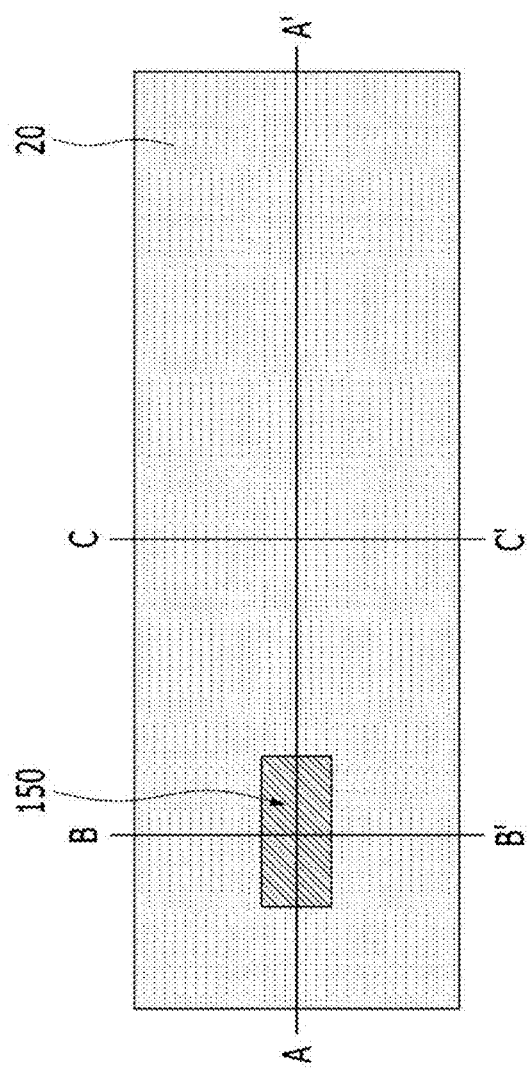
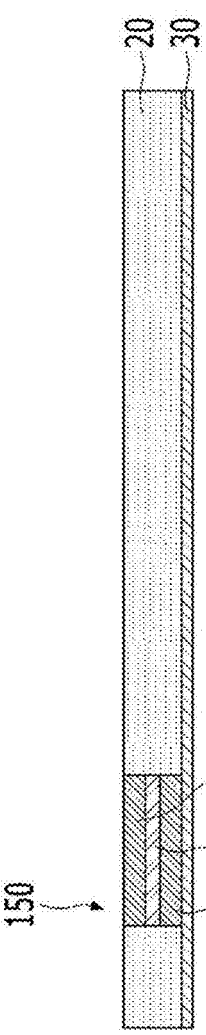
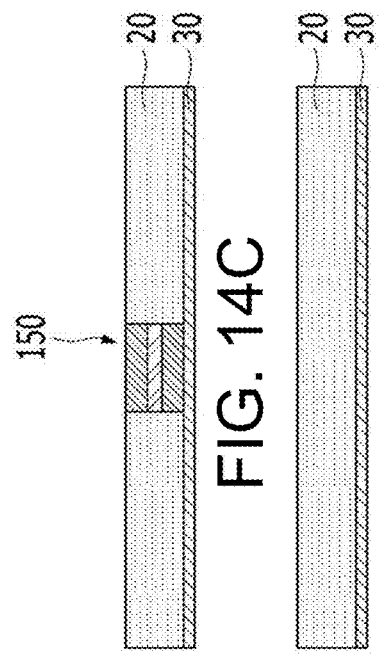
FIG. 14A
FIG. 14B
FIG. 14C
FIG. 14D

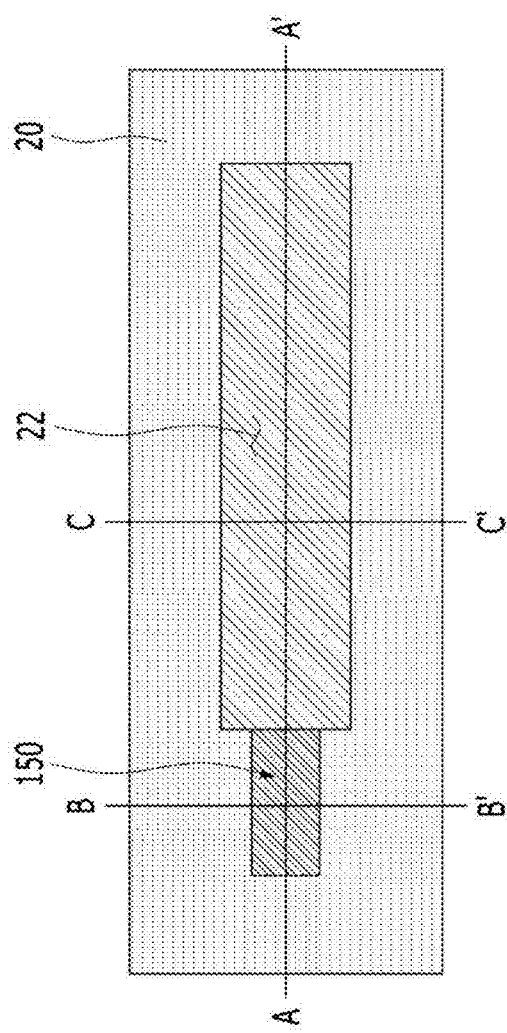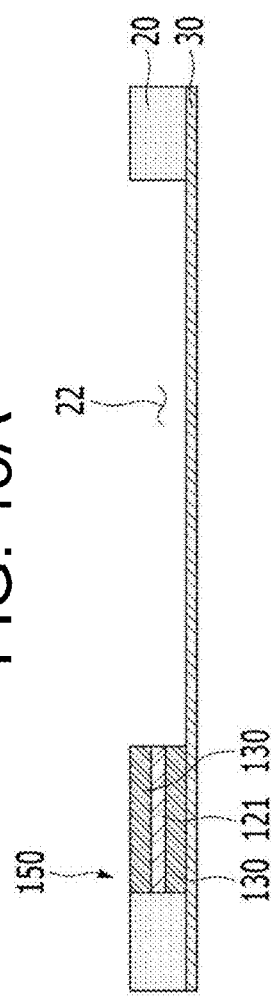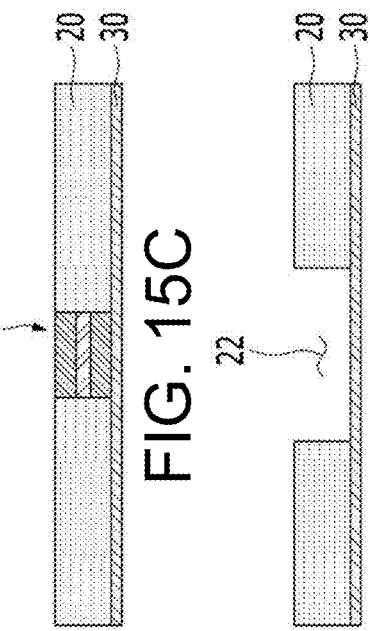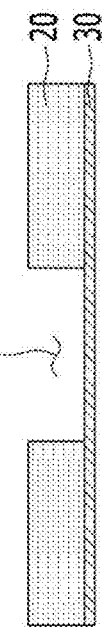
FIG. 15A
FIG. 15B
FIG. 15C
FIG. 15D

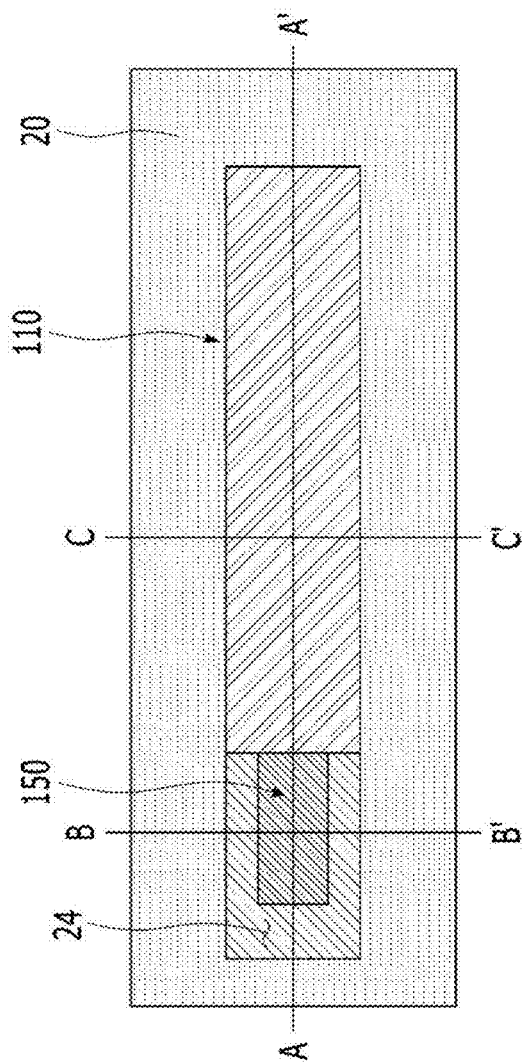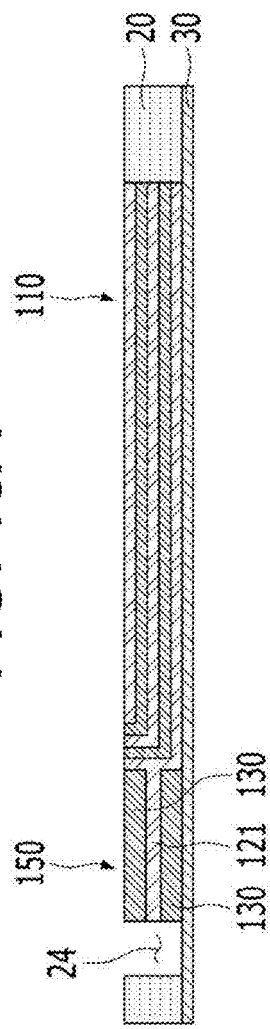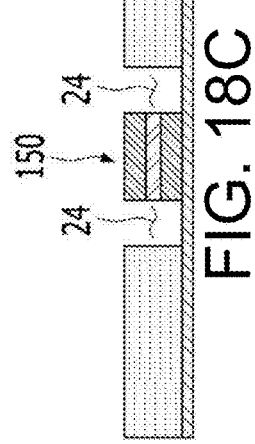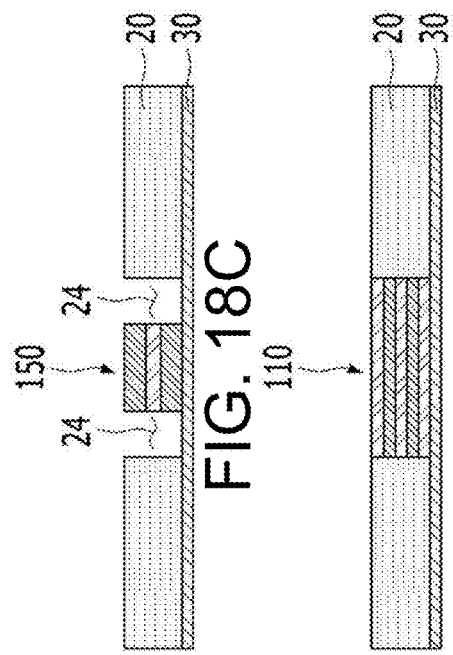
FIG. 18A
FIG. 18B
FIG. 18C
FIG. 18D

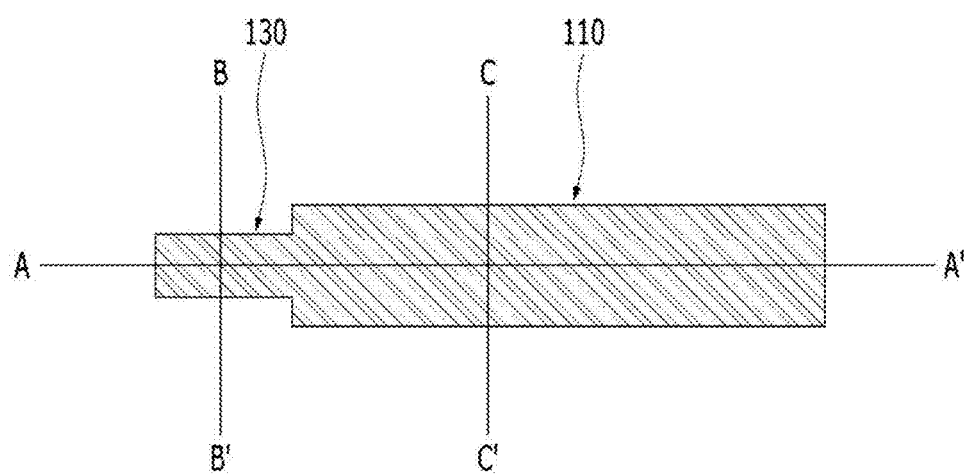
FIG. 19A
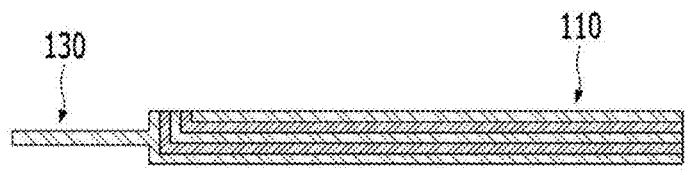 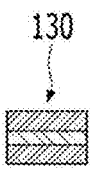
FIG. 19B FIG. 19C
FIG. 19D

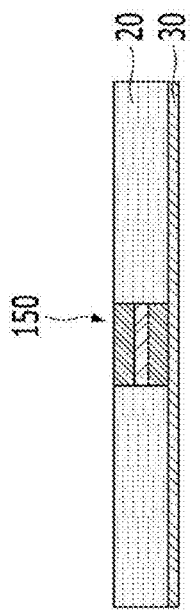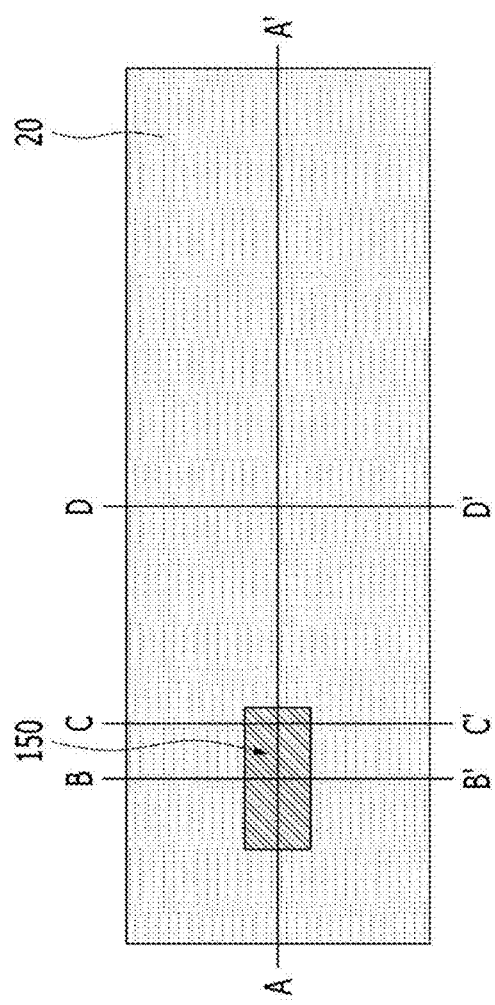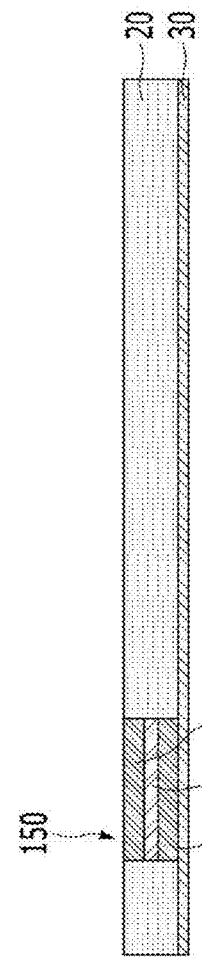

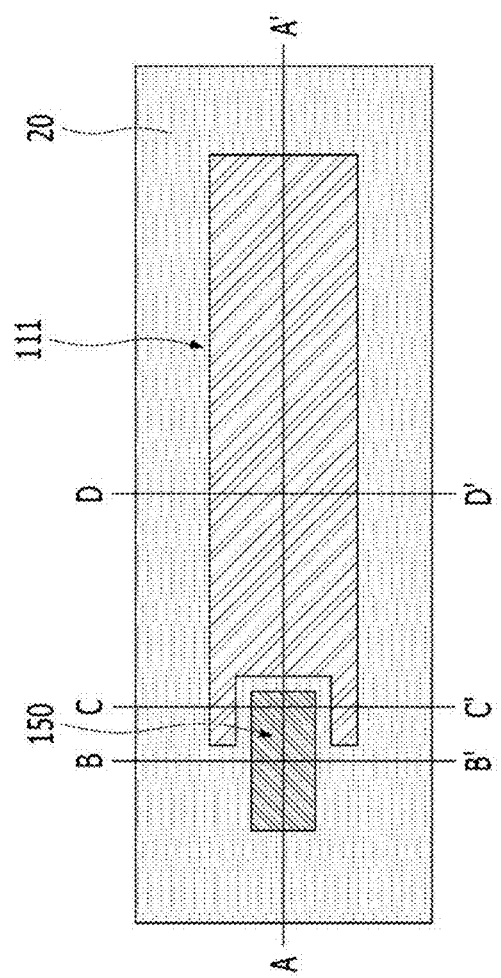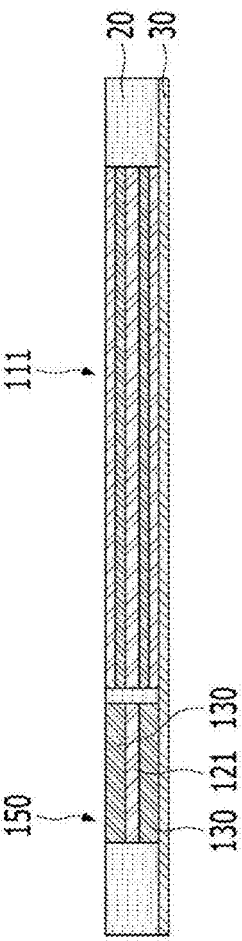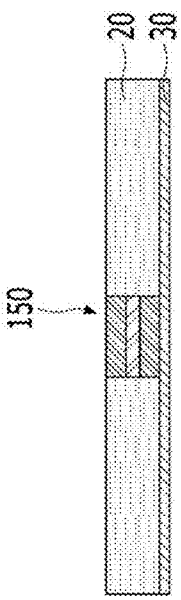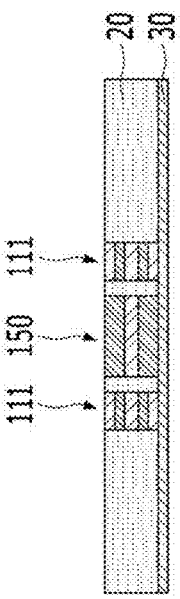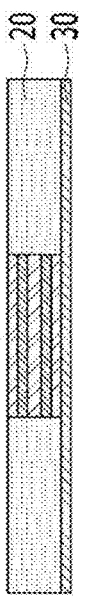

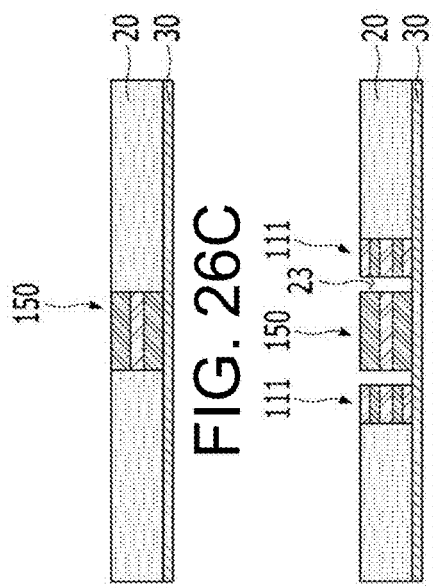
FIG. 26C
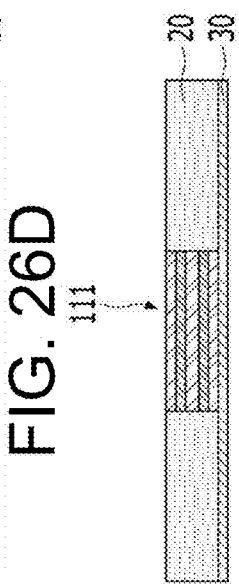
FIG. 26D
FIG. 26E
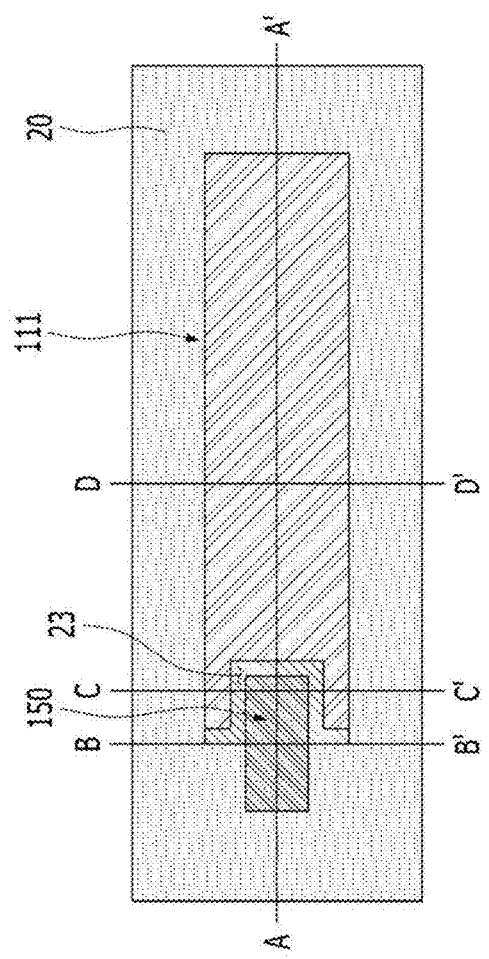
FIG. 26A
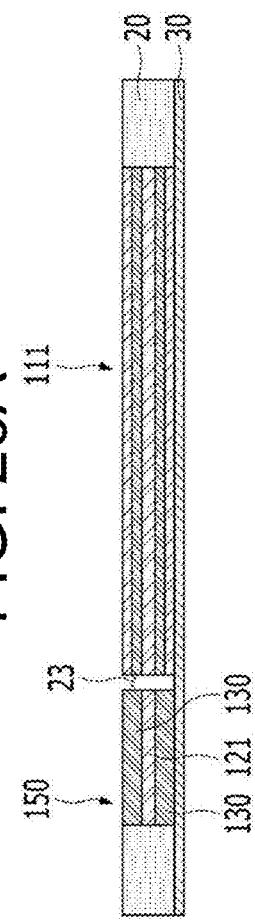
FIG. 26B

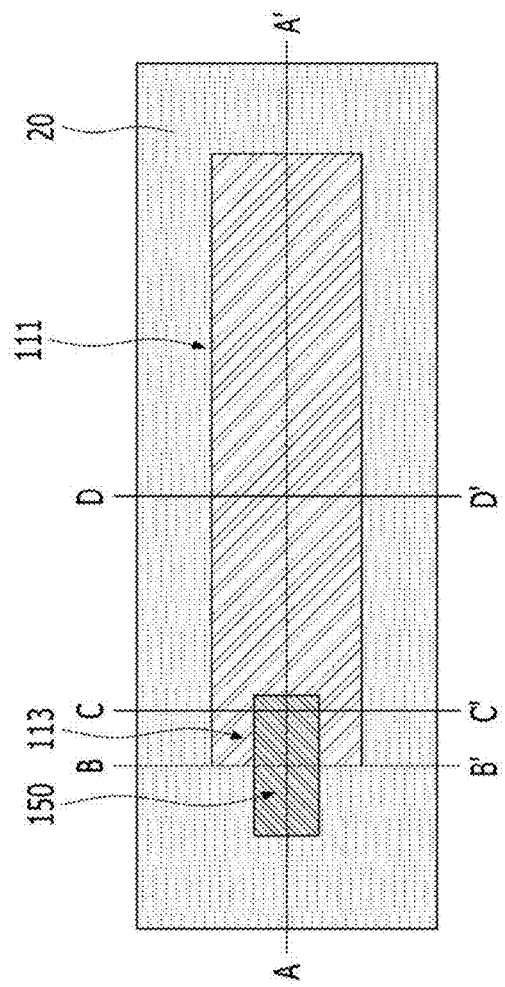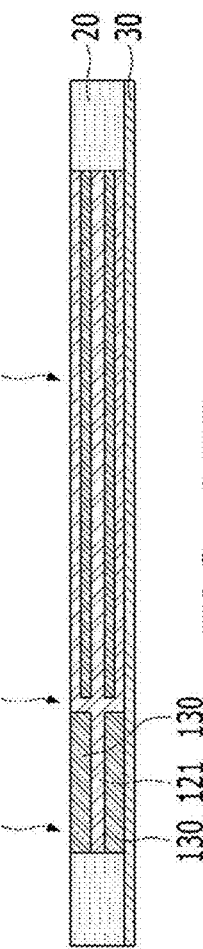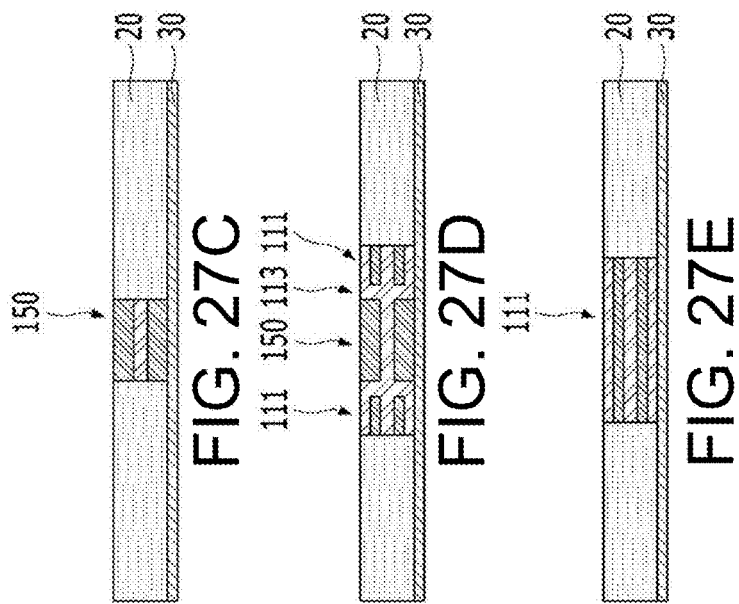

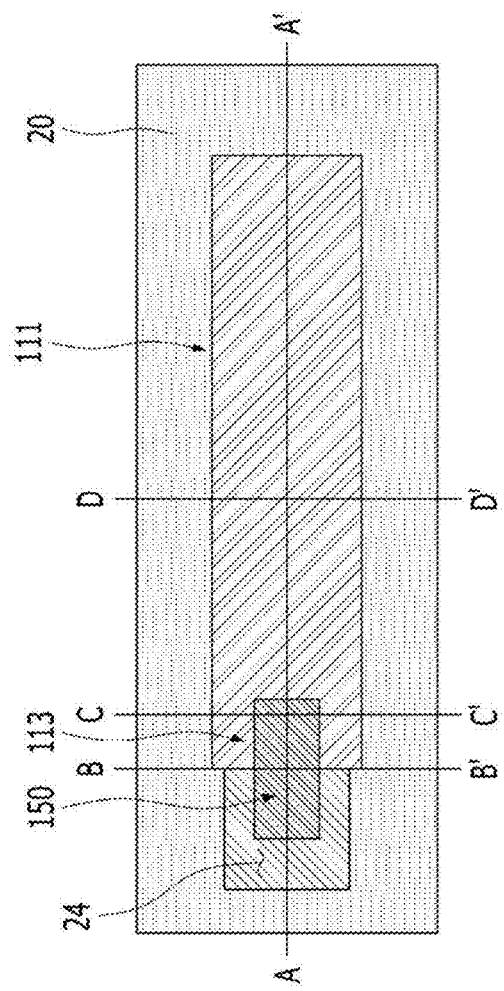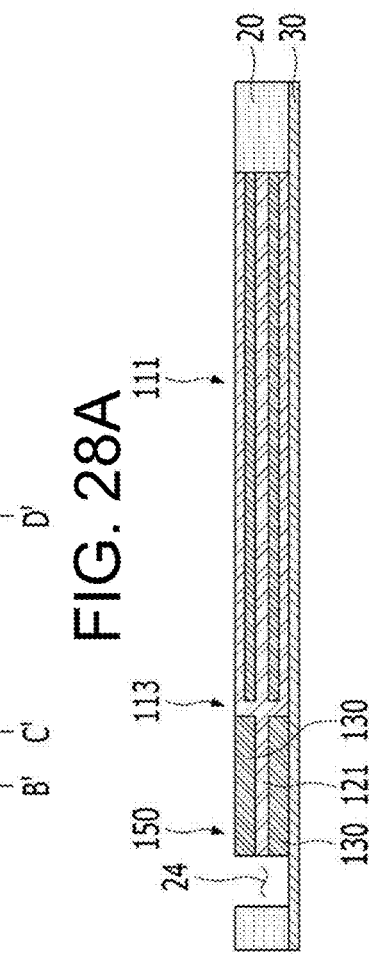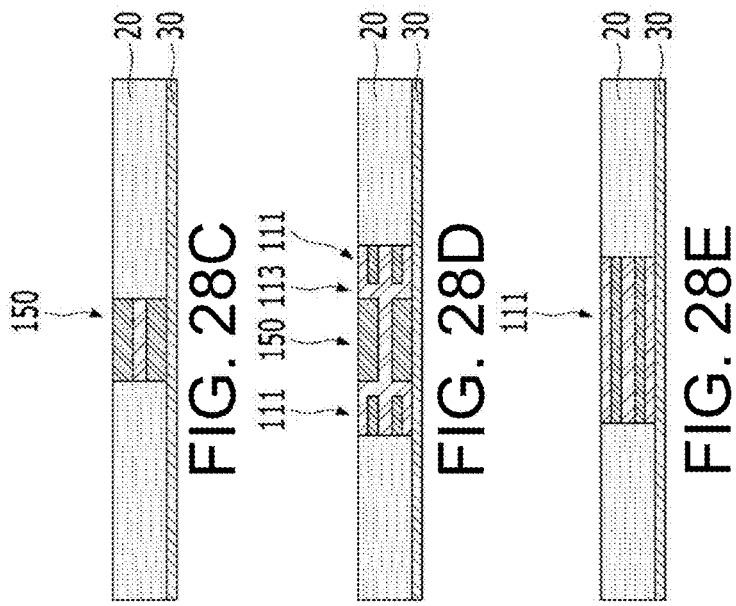

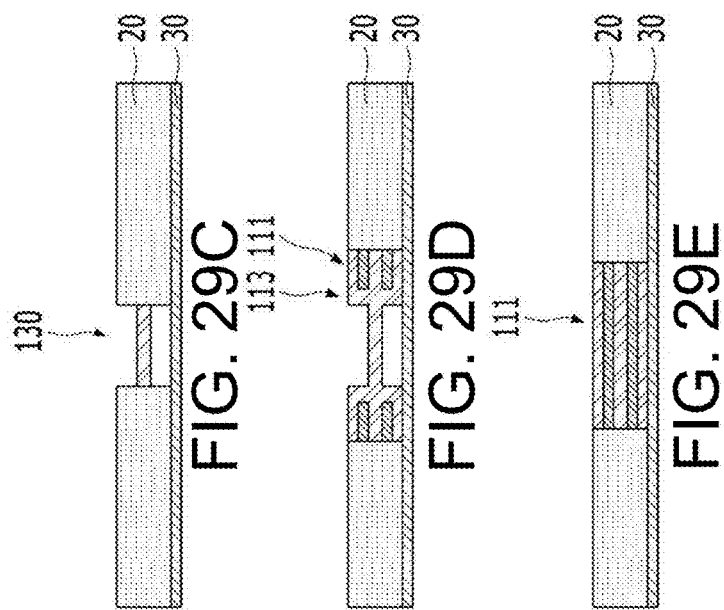
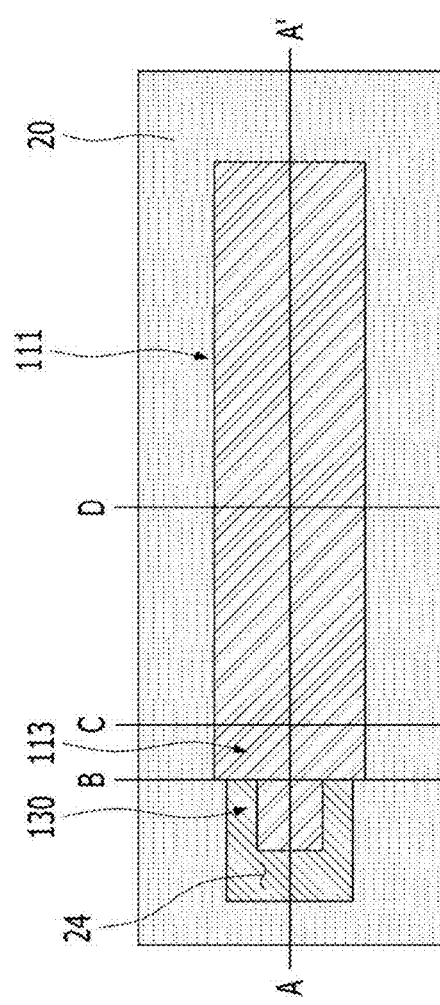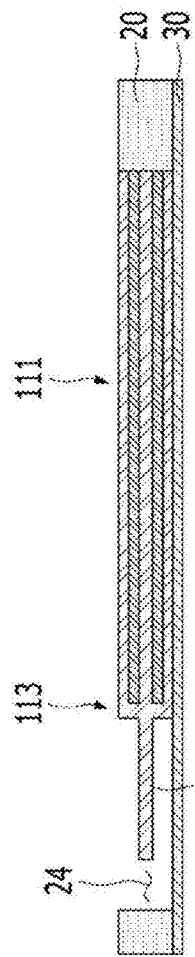

ELECTRICALLY CONDUCTIVE CONTACT PIN AND MANUFACTURING METHOD THEREFOR

TECHNICAL FIELD

The present disclosure relates to an electrically conductive contact pin and a manufacturing method therefor.

BACKGROUND ART

Electrically conductive contact pins are contact pins that can be used in probe cards or test sockets that contact and inspect an object. Hereinafter, contact pins of a probe card will be described as an example.

A test for electrical characteristics of a semiconductor device is performed by approaching a wafer to a probe card having a plurality of electrically conductive contact pins and then bringing the respective electrically conductive contact pins into contact with corresponding electrode pads on the wafer. After the electrically conductive contact pins reach positions where they are brought into contact with the electrode pads, a process of further approaching the wafer to the probe card is performed. This process is called overdrive. Overdrive is a process that elastically deforms the electrically conductive contact pins. By overdrive, all electrically conductive contact pins can be reliably brought into contact with the electrode pads even when there is a height difference between the electrode pads or the electrically conductive contact pins. During overdrive, each electrically conductive contact pin is elastically deformed, and performs scrubbing while a tip thereof moves on an electrode pad. By such scrubbing, an oxide film on a surface of the electrode pad can be removed and contact resistance can be reduced thereby.

Meanwhile, electrically conductive contact pins may be manufactured using an MEMS process. A process of manufacturing an electrically conductive contact pin using the MEMS process involves first applying a photoresist to a surface of a conductive substrate and then patterning the photoresist. After that, a metal material is deposited within openings by electroplating using the photoresist as a mold, and the photoresist and the conductive substrate are removed to obtain electrically conductive contact pins. Here, each electrically conductive contact pin is formed by stacking a plurality of metal materials vertically. An end portion of the electrically conductive contact pin is a part that is brought into contact with an object. When the electrically conductive contact pin is composed of the plurality of metal materials stacked vertically, it is difficult to differ only the content of the metal material between a body portion and the end portion of the electrically conductive contact pin, so there is a limit to improving the current carrying capacity of the electrically conductive contact pin.

In particular, when the electrically conductive contact pin is brought into contact with an object, the pressing force is not concentrated on the contact area, so the pressing force applied in the length direction of the electrically conductive contact pin causes unintended deformation of the electrically conductive contact pin, and in severe cases, causes buckling.

DOCUMENTS OF RELATED ART

Patent Documents (Patent Document 1) Korean Patent No. 10-0449308

DISCLOSURE

Technical Problem

Accordingly, the present disclosure has been made keeping in mind the above problems occurring in the related art, and an objective of the present disclosure is to provide an electrically conductive contact pin formed by stacking a plurality of metal layers and a manufacturing method therefor, in which unintentional deformation of the electrically conductive contact pin is prevented by concentrating a pressing force pressing the electrically conductive contact pin on a tip portion having a relatively small cross-sectional area.

Another objective of the present disclosure is to provide an electrically conductive contact pin formed by stacking a plurality of metal layers and a manufacturing method therefor, in which the electrically conductive contact pin has improved physical or electrical characteristics.

Technical Solution

In order to accomplish the above objectives, according to one aspect of the present disclosure, there is provided an electrically conductive contact pin, including: a body portion including a stacked portion formed by stacking a plurality of metal layers; and a tip portion protruding from at least one end portion of the body portion and having a smaller cross-sectional area than the body portion.

In addition, an upper surface of the tip portion may be spaced apart from a plane extending from an upper surface of the body portion, a lower surface of the tip portion may be spaced apart from a plane extending from a lower surface of the body portion, a first side surface of the tip portion may be spaced apart from a plane extending from a first side surface of the body portion, and a second side surface of the tip portion may be spaced apart from a plane extending from a second side surface of the body portion.

In addition, a central axis of the tip portion and a central axis of the end portion of the body portion may be located on the same line.

In addition, the tip portion may be made of a single material.

In addition, the stacked portion may include a first metal and a second metal. The first metal may be a metal having relatively high wear resistance compared to the second metal and the second metal may be a metal having relatively high electrical conductivity compared to the first metal. The tip portion may be made of a metal having relatively high wear resistance compared to the second metal.

In addition, the first metal may be made of at least one metal selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy, and the second metal may be made of at least one metal selected from the group consisting of copper (Cu), silver (Ag), gold (Au), and an alloy of these metals In addition, the tip portion may include an inner portion located inside the body portion and an outer portion located outside the body portion.

In addition, the body portion may be provided on left and right sides of the inner portion with respect to the inner portion, and a free space portion in which the body portion is not provided may be formed on each of upper and lower sides of the inner portion with respect to the inner portion.

In addition, the body portion may be provided on left and right sides of the inner portion with respect to the inner portion, and a reinforcing portion made of a material different from a material of the tip portion may be formed on each of upper and lower sides of the inner portion with respect to the inner portion.

In addition, a metal formed on left and right sides of the inner portion with respect to the inner portion and a metal formed on upper and lower sides of the inner portion may be made of different materials.

Meanwhile, according to another aspect of the present disclosure, there is provided an electrically conductive contact pin, including: a body portion including a stacked portion formed by stacking a plurality of metal layers; a tip portion formed by a metal layer made of a single material and protruding from an end portion of the body portion; and a connecting portion provided in the body portion between the stacked portion and the tip portion. Here, the tip portion may be made of a metal selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy, and the connecting portion may be made of a metal selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy In addition, the connecting portion may be formed by a metal layer made of a single material.

Meanwhile, according to another aspect of the present disclosure, there is provided a method for manufacturing an electrically conductive contact pin, the electrically conductive contact pin including a body portion including a stacked portion formed by stacking a plurality of metal layers and a tip portion protruding from an end portion of the body portion, the method including: forming each of the body portion and the tip portion by plating using a mold.

In addition, the mold may be made of an anodic aluminum oxide film.

Advantageous Effects

The present disclosure provides an electrically conductive contact pin formed by stacking a plurality of metal layers and a manufacturing method therefor, in which unintentional deformation of the electrically conductive contact pin is prevented by concentrating a pressing force pressing the electrically conductive contact pin on a tip portion having a relatively small cross-sectional area.

In addition, the present disclosure provides an electrically conductive contact pin formed by stacking a plurality of metal layers and a manufacturing method therefor, in which the electrically conductive contact pin has improved physical or electrical characteristics.

DESCRIPTION OF DRAWINGS

FIGS. 2A to 10E are views illustrating a manufacturing method for the electrically conductive contact pin according to the first embodiment of the present disclosure

FIGS. 13A to 19D are views illustrating a manufacturing method for the electrically conductive contact pin according to the second embodiment of the present disclosure

FIGS. 22A to 30E are views illustrating a manufacturing method for the electrically conductive contact pin according to the third embodiment of the present disclosure

MODE FOR INVENTION

Figure 1:
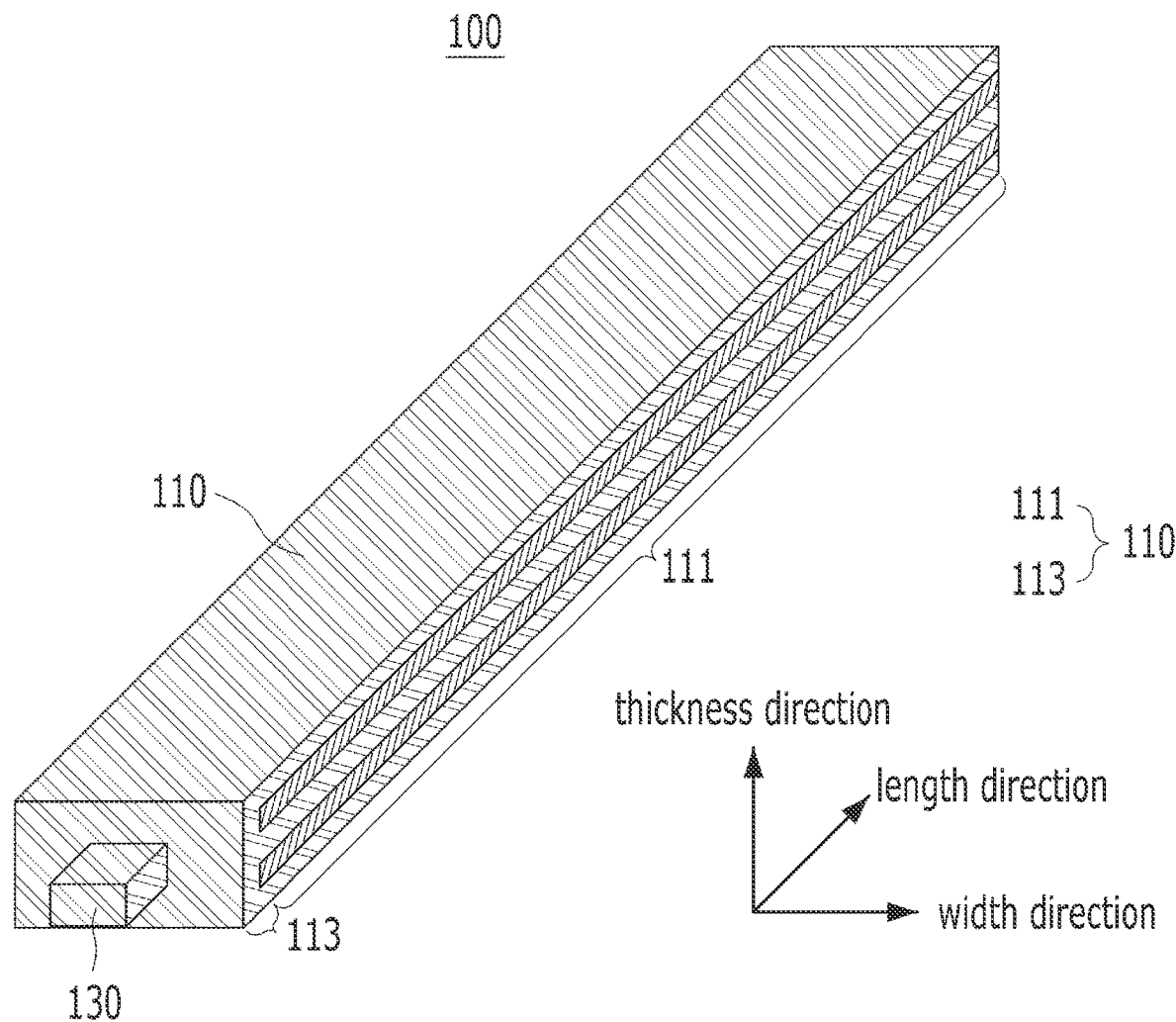
FIG. 1 is a view illustrating an electrically conductive contact pin according to a first embodiment of the present disclosure.

Contents of the description below merely exemplify the principle of the present disclosure. Therefore, those of ordinary skill in the art may implement the theory of the present disclosure and invent various apparatuses which are included within the concept and the scope of the present disclosure even though it is not clearly explained or illustrated in the description. Furthermore, in principle, all the conditional terms and embodiments listed in this description are clearly intended for the purpose of understanding the concept of the present disclosure, and one should understand that the present disclosure is not limited to the exemplary embodiments and the conditions.

The above described objectives, features, and advantages will be more apparent through the following detailed description related to the accompanying drawings, and thus those of ordinary skill in the art may easily implement the technical spirit of the present disclosure.

The embodiments of the present disclosure will be described with reference to cross-sectional views and/or perspective views which schematically illustrate ideal embodiments of the present disclosure. For explicit and convenient description of the technical content, thicknesses of films and regions in the figures may be exaggerated. Therefore, variations from the shapes of the illustrations as a result, for example, of manufacturing techniques and/or tolerances, are to be expected. In addition, a limited number of electrically conductive contact pins are illustrated in the drawings by way of example. Thus, the embodiments should not be construed as limited to the particular shapes of regions illustrated herein but are to include deviations in shapes that result, for example, from manufacturing. The technical terms used herein are for the purpose of describing particular embodiments only and should not be construed as limiting the present disclosure. As used herein, the singular forms are intended to include the plural forms as well, unless the context clearly indicates otherwise. It will be further understood that the terms "comprise", "include", "have", etc. when used herein, specify the presence of stated features, integers, steps, operations, elements, components, and/or combinations thereof but do not preclude the presence or addition of one or more other features, integers, steps, operations, elements, components, and/or combinations thereof.

Hereinafter, exemplary embodiments of the present disclosure will be described in detail with reference to the accompanying drawings. Wherever possible, the same reference numerals will be used throughout different embodiments and the description to refer to the same or like elements or parts. In addition, the configuration and operation already described in other embodiments will be omitted for convenience.

An electrically conductive contact pin 100 according to an embodiment of the present disclosure is provided in an inspection apparatus and is used to transmit electrical signals by making electrical and physical contact with an inspection object. The inspection apparatus may be an inspection apparatus used in a semiconductor manufacturing process, for example, a probe card or a test socket. However, the inspection apparatus according to the embodiment of the present disclosure is not limited thereto and includes any apparatus for checking whether the inspection object is defective by applying electricity. Hereinafter, a probe card will be described as an example of the inspection apparatus. A test for electrical characteristics of a semiconductor device is performed by approaching a wafer W to a probe card having a plurality of electrically conductive contact pins 100 and then bringing the respective electrically conductive contact pins 100 into contact with corresponding electrode pads WP on the wafer W. After the electrically conductive contact pins 100 reach positions where they are brought into contact with the electrode pads WP, the wafer W may be further lifted by a predetermined height toward the probe card. The electrically conductive contact pins 100 have a structure inserted into guide holes of a guide plate and elastically deformed. These electrically conductive contact pins 100 are adopted to constitute a vertical probe card. As an embodiment of the present disclosure, the electrically conductive contact pin 100 has a pre-deformed structure, that is, a cobra pin shape, or a structure for deforming a straight pin by moving an upper, lower, or additional guide plate.

First Embodiment

Hereinafter, an electrically conductive contact pin 100 according to a first embodiment of the present disclosure will be described with reference to FIGS. 1 to 11B. FIG. 1 is a view illustrating the electrically conductive contact pin 100 according to the first embodiment of the present disclosure. FIGS. 2A to 10E are views illustrating a manufacturing method for the electrically conductive contact pin 100 according to the first embodiment of the present disclosure. FIG. 11A is an enlarged view illustrating an end portion of an electrically conductive contact pin 100 according to the first embodiment of the present disclosure, in which an example of a metal material configuration of the electrically conductive contact pin is illustrated. FIG. 11B is an enlarged view illustrating an end portion of an electrically conductive contact pin 100 according to the first embodiment of the present disclosure, in which another example of a metal material configuration of the electrically conductive contact pin is illustrated Referring to FIG. 1 and FIGS. 11A and 11B, the electrically conductive contact pin 100 according to the first embodiment of the present disclosure includes a body portion 110 including a stacked portion 111 formed by stacking a plurality of metal layers in the vertical direction (thickness direction); and a tip portion 130 protruding from an end portion of the body portion 110. The tip portion 130 is provided on at least one end portion of the body portion 110 and may be provided on one end or each end portion of the body portion 110

The tip portion 130 is provided to protrude from the end portion of the body portion 110 and has a smaller cross-sectional area than the body portion 110.

An upper surface of the tip portion 130 is spaced apart from a plane extending from an upper surface of the body portion 110. A lower surface of the tip portion 130 is spaced apart from a plane extending from a lower surface of the body portion 110. A first side surface of the tip portion 130 is spaced apart from a plane extending from a first side surface of the body portion 110. A second side of the tip portion 130 is spaced apart from a plane extending from a second side surface of the body portion 110. That is, the tip portion 130 is located within planes that virtually extend from the upper, lower, and left and right side surfaces of the body portion 110. With this, the cross-sectional area of the tip portion 130 is smaller than that of the end portion of the body portion 110 to which the tip portion 130 is connected.

The vertical cross-section of the body portion 110 may have a rectangular shape, and the vertical cross-section of the tip portion 130 may also have a rectangular shape.

In addition, the central axis of the tip portion 130 and the central axis of the end portion of the body portion 110 are located on the same line.

With this configuration, a pressing force pressing the electrically conductive contact pin 100 is concentrated on the tip portion 130, which has a relatively small cross-sectional area, thereby increasing a contact pressure. In addition, the electrically conductive contact pin 100 is prevented from being unintentionally deformed.

Meanwhile, the tip portion 130 may be located within a core of a cross-section that is determined by the vertical cross-sectional shape of the body portion 110. Here, the core of the cross-section is an inside formed by connecting the points of action that causes only compressive stress within the cross-section depending on the eccentric distance of eccentric load. With this, the tip portion 130 may generate only compressive stress and not tensile stress to be generated inside the body portion 110. When the tip portion 130 is not in the core of the cross-section of the body portion 110, not only compressive stress but also tensile stress is generated in the body portion 110. This causes interfacial delamination between the plurality of metal layers. However, when the tip portion 130 is located within the core of the vertical cross-section of the body portion 110, a force applied to the body portion 110 by the tip portion 130 generates only compressive stress in the body portion 110, thereby preventing interfacial delamination between the plurality of metal layers. Therefore, it is preferable that the tip portion 130 is provided within a core range of a cross-section that causes only compressive stress in the body portion 110.

The body portion 110 of the electrically conductive contact pin 100 includes the stacked portion 111 formed by stacking the plurality of metal layers.

The stacked portion 111 include a first metal 121 and a second metal 123.

The first metal 121 is a metal having relatively high wear resistance compared to the second metal 123, and may be selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn) alloy, a nickel-cobalt (NiCo), and a nickel-tungsten (NiW) alloy The second metal 123 is a metal having relatively high electrical conductivity compared to the first metal 121, and may be selected from the group consisting of copper (Cu), silver (Ag), gold (Au), and an alloy of these metals.

The tip portion 130 is made of a metal having relatively high wear resistance compared to the second metal 123. Preferably, the tip portion 130 is made of the first metal 121. The tip portion 130 may be made of the same material as the material of at least one of the metal layers constituting the stacked portion 111 or may be made of a material different from the materials of the metal layers constituting the stacked portion 111. For example, the stacked portion 111 may be formed by alternately stacking the first metal 121 made of a palladium-cobalt (PdCo) alloy and the second metal 123 made of copper (Cu). In this case, the tip portion 130 may be made of the first metal 121 made of a palladium-cobalt (PdCo) alloy or the first metal 121 made of rhodium (Rh). Meanwhile, the tip portion 130 may be formed by a metal layer made of a single material The body portion 110 includes the stacked portion 111 and a connecting portion 113 formed separately in the length direction of the electrically conductive contact pin 100. The connecting portion 113 is provided in the body portion 110 between the stacked portion 111 and the tip portion 130. The connecting portion 113 is entirely formed at the end portion of the body portion 110.

The connecting portion 113 may be formed by a metal layer made of a single material. Preferably, the connecting portion 113 is made of the first metal 121. For example, the tip portion 130 may be made of the first metal 121 made of a palladium-cobalt (PdCo) alloy. In this case, the connecting portion 113 may be made of the first metal 121 made of a palladium-cobalt (PdCo) alloy or the first metal 121 made of rhodium (Rh). However, in FIG. 1, the connecting portion 123 is illustrated as being made of the first metal 121 made of a palladium-cobalt (PdCo) alloy The tip portion 130 of the electrically conductive contact pin 100 is a part that is brought into contact with an object. With the configuration of the tip portion 130 made of the first metal 121 having high wear resistance or hardness, it is possible to improve the physical characteristics of the tip portion 130. In addition, by increasing the content of a metal having high wear resistance or high hardness in the tip portion 130 of the electrically conductive contact pin 100, the content of a metal having high electrical conductivity can be increased in the body portion 110 of the electrically conductive contact pin 100. Thus, it is possible to improve the overall current carrying capacity.

The tip portion 130 has a length in the range of 100 μm to 400 μm. The electrically conductive contact pin 100 may be used by being inserted into a guide plate of a probe card. In this case, an end portion of the electrically conductive contact pin 100 protrudes from the bottom of the guide plate (lower guide plate). When the electrically conductive contact pin 100 is used for a long period of time and a number of times in this state, foreign substances stick to the end portion. To remove the foreign substances, a process of grinding the end portion is performed. Due to the process of grinding the end portion, the length of the electrically conductive contact pin 100 is shortened. A protruding length of the electrically conductive contact pin 100 from the bottom of the guide plate (lower guide plate) is preferably in the range of 100 μm to 400 μm. When the protruding length becomes less than 100 μm as a result of the grinding process, the electrically conductive contact pin 100 is replaced with a new one. With the configuration in which the length of the tip portion 130 ranges from 100 μm to 400 μm, even when the tip portion 130 is ground in the range of 100 μm to 400 μm, it is possible to make the tip portion 130 exist at the end portion. Thus, the cross-sectional shape of the tip portion 130 of the electrically conductive contact pin 100 can be maintained in an initial state.

In performing the grinding process, when the tip portion 130 no longer exists, it is preferable to replace the electrically conductive contact pin 100 with a new one.

Meanwhile, hundreds to thousands of guide holes are formed in the guide plate. The electrically conductive contact pin 100 is inserted into each of the guide holes. The tip portion 130 has a width in the range of 10 μm to 40 μm in consideration of manufacturing tolerance of the guide holes of the guide plate and alignment error between the electrically conductive contact pin 100 and the inspection object. With this range, it is possible to enable the tip portion 130 to make contact with the inspection object even when a horizontal position error occurs between the tip portion 130 of the electrically conductive contact pin 100 and the inspection object.

Hereinafter, a manufacturing method for the electrically conductive contact pin 100 according to the first embodiment of the present disclosure will be described with reference to FIGS. 2A to 10E The manufacturing method for the electrically conductive contact pin 100 according to the first embodiment of the present disclosure, the electrically conductive contact pin 100 including a body portion 110 including a stacked portion 111 formed by stacking a plurality of metal layers and a tip portion 130 protruding from an end portion of the body portion 110, includes: forming each of the body portion 110 and the tip portion 130 by plating using a mold. This will be described in detail below.

First, referring to FIGS. 2A, 2B, 2C, 2D, and 2E, FIG. 2A is a plan view illustrating the mold 20 in which a first inner space 21 is formed, FIG. 2B is a sectional view taken along line A-A' of FIG. 2A, FIG. 2C is a sectional view taken along line B-B' of FIG. 2A, FIG. 2D is a sectional view taken along line C-C' of FIG. 2A, and FIG. 2E is a sectional view taken along line D-D' of FIG. 2A Referring to FIGS. 2A, 2B, 2C, 2D, and 2E, the first inner space 21 is formed in the mold 20, and a seed layer 30 is provided under the mold 20

The mold 20 may be made of an anodic aluminum oxide film, a photoresist, a silicon wafer, or a material similar thereto. However, a preferred material for the mold 20 is the anodic aluminum oxide film. The anodic aluminum oxide film means a film formed by anodizing a metal as a base material, and pores mean holes formed in the process of forming the anodic aluminum oxide film by anodizing the metal. For example, when the metal as the base material is aluminum (Al) or an aluminum alloy, the anodization of the base material forms the anodic aluminum oxide film consisting of anodized aluminum ($Al_2O_3$) on a surface of the base material. However, the metal is not limited thereto, and includes Ta, Nb, Ti, Zr, Hf, Zn, W, Sb, or an alloy of these metals. The resulting anodic aluminum oxide film includes a barrier layer in which no pores are formed therein vertically, and a porous layer in which pores are formed therein. After removing the base material on which the anodic aluminum oxide film having the barrier layer and the porous layer is formed, only the anodic aluminum oxide film consisting of anodized aluminum ($Al_2O_3$) remains. The anodic aluminum oxide film may have a structure in which the barrier layer formed during the anodization is removed to expose the top and bottom of the pores, or a structure in which the barrier layer formed during the anodization remains to close one of the top and bottom of the pores.

The anodic aluminum oxide film has a coefficient of thermal expansion of 2 to 3 ppm/° C. With this range, the anodic aluminum oxide film only undergoes a small amount of thermal deformation due to temperature when exposed to a high temperature environment. Thus, even when the electrically conductive contact pin 100 is manufactured in a high temperature environment, a precise electrically conductive contact pin 100 can be manufactured without thermal deformation.

Since the electrically conductive contact pin 100 according to the embodiment of the present disclosure is manufactured using the mold 20 made of the anodic aluminum oxide film instead of a photoresist mold, there is an effect of realizing shape precision and a fine shape, which were limited in realization with the photoresist mold. In addition, when the conventional photoresist mold is used, an electrically conductive contact pin with a thickness of 40 μm can be manufactured, but when the mold made of the anodic aluminum oxide film is used, the electrically conductive contact pin 100 with a thickness in the range of 100 μm to 200 μm can be manufactured.

The seed layer 30 is provided on a lower surface of the mold 20. The seed layer 30 may be provided on the lower surface of the mold 20 before the first inner space 21 is formed in the mold 20. Meanwhile, a support substrate (not illustrated) is formed under the mold 20 to improve handling of the mold 20. In this case, the seed layer 30 may be formed on an upper surface of the support substrate, and then the mold 20 having the first inner space 21 may be coupled to the support substrate. The seed layer 30 may be made of copper (Cu), and may be formed by a deposition method. The seed layer 30 is used to improve the plating quality of the body portion 110 and the tip portion 130 when they are formed using an electroplating method.

The first inner space 21 may be formed by wet-etching the mold 20 made of the anodic aluminum oxide film. To this end, a photoresist may be provided on the upper surface of the mold 20 and patterned, and then the anodic aluminum oxide film in a patterned and open area may react with an etchant to form the first inner space 21. In detail, after a photosensitive material is provided on the upper surface of the mold 20 in a state before the first inner space 21 is formed, exposure and development processes may be performed. At least a part of the photosensitive material may be patterned and removed to form an open area through the exposure and development processes. As a result of etching the mold 20 made of the anodic aluminum oxide film through the open area where the photosensitive material is removed by the patterning process, a part of the anodic aluminum oxide film at a position corresponding to the first inner space 21 is removed by the etchant to form the first inner space 21.

Next, referring to FIGS. 3A, 3B, 3C, 3D, and 3E, FIG. 3A is a plan view illustrating the mold 20 in which a temporary stacked portion 150 for forming the tip portion 130 is formed in the first inner space 21, FIG. 3B is a sectional view taken along line A-A' of FIG. 3A, FIG. 3C is a sectional view taken along line B-B' of FIG. 3A, FIG. 3D is a sectional view taken along line C-C' of FIG. 3A, and FIG. 3E is a sectional view taken along line D-D' of FIG. 3A The step of forming the temporary stacked portion 150 for forming the tip portion 130 in the first inner space 21 of the mold 20 by electroplating is performed. The temporary stacked portion 150 is formed by stacking a plurality of metal layers in the thickness direction of the electrically conductive contact pin 100 by performing electroplating a plurality of times. The temporary stacked portion 150 is formed by sequentially stacking a sacrificial layer 130, a first metal 121, and a sacrificial layer 130 from the bottom. The sacrificial layers 130 are made of a metal made of copper (Cu) and will be removed later by a copper etchant.

The first metal 121 is formed by setting the plating time so that the first metal 121 is located centrally in the thickness direction of the temporary stacked portion 150. With this, the temporary stacked portion 150 has a shape that is vertically symmetrical with respect to the center of the first metal 121.

After the plating process is completed, a planarization process may be performed. The metal protruding from the upper surface of the mold 20 is removed and planarized through a chemical mechanical polishing (CMP) process.

Next, referring to FIGS. 4A, 4B, 4C, 4D, and 4E, FIG. 4A is a plan view illustrating the mold 20 in which a second inner space 22 is formed, FIG. 4B is a sectional view taken along line A-A' of FIG. 4A, FIG. 4C is a sectional view taken along line B-B' of FIG. 4A, FIG. 4D is a sectional view taken along line C-C' of FIG. 4A, and FIG. 4E is a sectional view taken along line D-D' of FIG. 4A The step of removing a part of the mold 20 is performed. The second inner space 22 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the second inner space 22.

The second inner space 22 is formed to be spaced apart from the temporary stacked portion 150. The second inner space 22 is formed to have a larger width than the temporary stacked portion 150. That is, the width of the temporary stacked portion 150 is smaller than that of the second inner space 22. In addition, the second inner space 22 is formed so that the central axis of the temporary stacked portion 150 in the length direction and the central axis of the second inner space 22 in the length direction are located on the same line.

Next, referring to FIGS. 5A, 5B, 5C, 5D, and 5E, FIG. 5A is a plan view illustrating the mold 20 in which the stacked portion 111 of the body portion 110 is formed in the second inner space 22, FIG. 5B is a sectional view taken along line A-A' of FIG. 5A, FIG. 5C is a sectional view taken along line B-B' of FIG. 5A, FIG. 5D is a sectional view taken along line C-C' of FIG. 5A, and FIG. 5E is a sectional view taken along line D-D' of FIG. 5A The step of forming the stacked portion 111 of the body portion 110 is performed. The stacked portion 111 of the body portion 110 is formed in the second inner space 22 formed in the previous step by electroplating.

The stacked portion 111 includes a first metal 121 and a second metal 123. The first metal 121 is plated first so that it is located in the lowest layer, and then the second metal 123 is stacked. As a result, the first metal 121 and the second metal 123 are alternately stacked, and the first metal 121 is formed in the lowest and uppermost layers.

Next, referring to FIGS. 6A, 6B, 6C, 6D, and 6E, FIG. 6A is a plan view illustrating the mold 20 in which a third inner space 23 is formed, FIG. 6B is a sectional view taken along line A-A' of FIG. 6A, FIG. 6C is a sectional view taken along line B-B' of FIG. 6A, FIG. 6D is a sectional view taken along line C-C' of FIG. 6A, and FIG. 6E is a sectional view taken along line D-D' of FIG. 6A The step of removing a part of the mold 20 is performed. The third inner space 23 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the third inner space 23.

The third inner space 23 is provided between the temporary stacked portion 150 and the stacked portion 111. The mold 20 is exposed through two side surfaces of the third inner space 23, and the temporary stacked portion 150 and the stacked portion 111 are exposed through two opposing side surfaces of the third inner space 23.

Next, referring to FIGS. 7A, 7B, 7C, 7D, and 7E, FIG. 7 (a) is a plan view illustrating the mold 20 in which a connecting portion 113 is formed in third inner space 23, FIG. 7 (b) is a sectional view taken along line A-A' of FIG. 7 (a), FIG. 7 (c) is a sectional view taken along line B-B' of FIG. 7 (a), FIG. 7 (d) is a sectional view taken along line C-C' of FIG. 7 (a), and FIG. 7 (e) is a sectional view taken along line D-D' of FIG. 7 (a)

The step of forming the connecting portion 113 of the body portion 110 is performed. The connecting portion 113 of the body portion 110 is formed in the third inner space 23 formed in the previous step by electroplating The connecting portion 113 is made of a first metal 121. The connecting portion 113 may be made of the first metal 121 made of a palladium-cobalt (PdCo) alloy or the first metal 121 made of rhodium (Rh). However, in FIGS. 7A, 7B, 7C, 7D, and 7E, the connecting portion 123 is illustrated as being made of the first metal 121 made of a palladium-cobalt (PdCo) alloy Next, referring to FIGS. 8A, 8B, 8C, 8D, and 8E, FIG. 8A is a plan view illustrating the mold 20 in which a fourth inner space 24 is formed, FIG. 8B is a sectional view taken along line A-A' of FIG. 8A, FIG. 8C is a sectional view taken along line B-B' of FIG. 8A, FIG. 8D is a sectional view taken along line C-C' of FIG. 8A, and FIG. 8E is a sectional view taken along line D-D' of FIG. 8A The step of removing a part of the mold 20 is performed. The fourth inner space 24 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the fourth inner space 24.

The fourth inner space 24 is formed outside the temporary stacked portion 150 so that the sacrificial layers 130 of the temporary stacked portion 150 are exposed. Preferably, in order to effectively remove the sacrificial layers 130, the fourth inner space 24 is formed to surround the outside of the temporary stacked portion 150.

Referring to FIGS. 9A, 9B, 9C, 9D, and 9E, FIG. 9A is a plan view illustrating the mold 20 in which the sacrificial layers 130 of the temporary stacked portion 150 are removed, FIG. 9B is a sectional view taken along line A-A' of FIG. 9A, FIG. 9C is a sectional view taken along line B-B' of FIG. 9A, FIG. 9D is a sectional view taken along line C-C' of FIG. 9A, and FIG. 9E is a sectional view taken along line D-D' of FIG. 9A An etchant that selectively reacts only with the sacrificial layers 130 is injected into the fourth inner space 24 to remove the sacrificial layers 130 of the temporary stacked portion 150. In the previous step, the temporary stacked portion 150 is provided by sequentially stacking the sacrificial layer 130, the first metal 121, and the sacrificial layer 130. Here, the sacrificial layers 130 provided on and under the first metal 121 are removed. With this, the tip portion 130 made of the first metal 121 has a first end connected to the connecting portion 113 and a second end serving as a free end, so that the tip portion 130 is connected to the connecting portion 113 in a cantilever shape.

When the sacrificial layers 130 are made of a metal made of copper (Cu), the etchant is a copper etchant that can selectively remove the metal made of copper (Cu). Here, since the connecting portion 113 is made of a metal selected from the materials of the first metal 121, it does not react with the copper etchant. As a result, the connecting portion 113 prevents the etchant from penetrating into the stacked portion 111, so that the second metal 123 constituting the stacked portion 111 and the copper etchant do not react with each other.

Figure 10A:
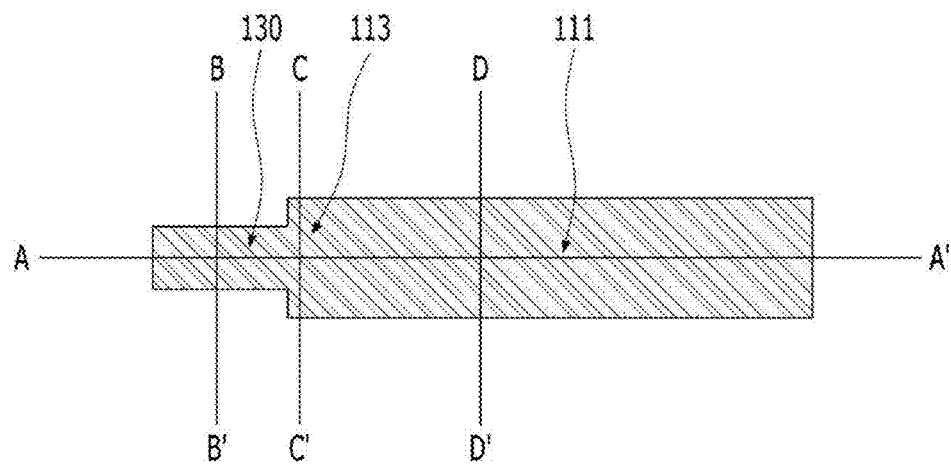
Figure 10B:
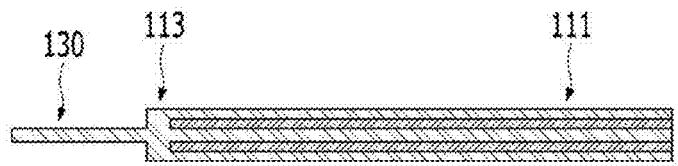
Figure 10C:
Figure 10D:
Figure 10E:
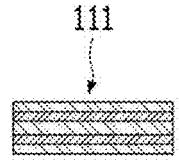
Figure 11B:
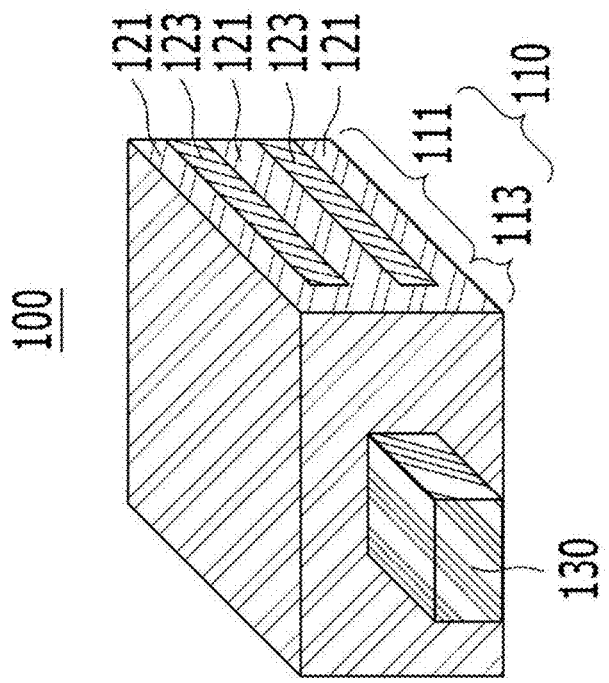
FIG. 11B is an enlarged view illustrating an end portion of an electrically conductive contact pin according to the first embodiment of the present disclosure, in which another example of a metal material configuration of the electrically conductive contact pin is illustrated
Figure 11A:
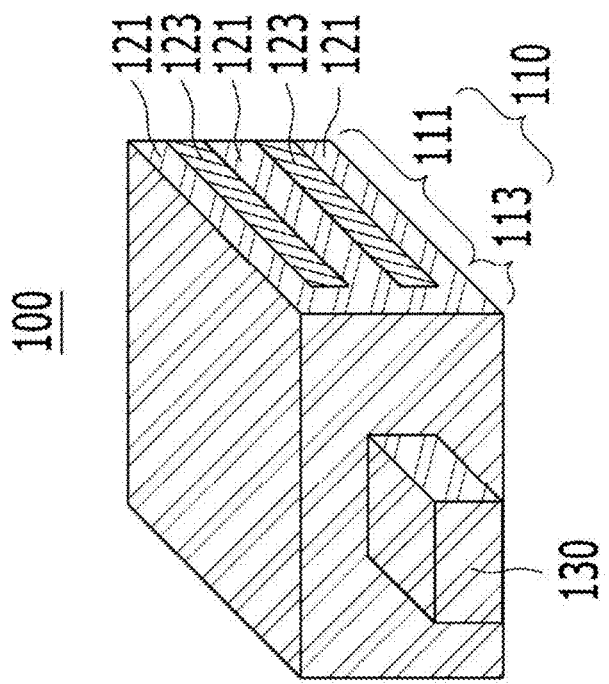
FIG. 11A is an enlarged view illustrating an end portion of an electrically conductive contact pin according to the first embodiment of the present disclosure, in which an example of a metal material configuration of the electrically conductive contact pin is illustrated

Next, referring to FIGS. 10A, 10B, 10C, 10D, and 10E, FIG. 10A is a plan view illustrating the electrically conductive contact pin 100, FIG. 10B is a sectional view taken along line A-A' of FIG. 10A, FIG. 10C is a sectional view taken along line B-B' of FIG. 10A, FIG. 10D is a sectional view taken along line C-C' of FIG. 10A, and FIG. 10E is a sectional view taken along line D-D' of FIG. 10A The step of removing the mold 20 and the seed layer 30 is performed after the previous step. When the mold 20 is made of the anodic aluminum oxide film, the mold 20 is removed using a solution that selectively reacts with the anodic aluminum oxide film. In addition, when the seed layer 30 is made of copper (Cu), the seed layer 30 is removed using a solution that selectively reacts with copper (Cu). The seed layer 30 may be removed with the copper etchant used to remove the sacrificial layers 130 in the previous step. However, when the sacrificial layers are exposed to the copper etchant for a long period of time to remove the seed layer 30, other parts may also be affected. Thus, it is preferable to remove the seed layer 30 through a separate process in this step.

In the previous description, it has been described that the temporary stacked portion 150 is formed first by plating the first inner space 21 using the mold 20 in which the first inner space 21 is formed, then the stacked portion 111 is formed by forming the second inner space 22 by removing the part of the mold 20 and then plating the second inner space 22, and finally the connecting portion 113 is formed by forming the third inner space 23 and plating the third inner space 23. However, the formation order is not limited thereto, and the temporary stacked portion 150, the stacked portion 111, and the connecting portion 113 may be formed in a different order from the above. However, even in this case, the metal constituting the connecting portion 113 has to be a metal that does not react with the etchant for removing the sacrificial layers 130 of the temporary stacked portion 150.

FIG. 11A is an enlarged view illustrating an end portion of an electrically conductive contact pin 100 according to the first embodiment of the present disclosure, in which an example of a metal material configuration of the electrically conductive contact pin is illustrated. FIG. 11B is an enlarged view illustrating an end portion of an electrically conductive contact pin 100 according to the first embodiment of the present disclosure, in which another example of a metal material configuration of the electrically conductive contact pin is illustrated Referring to FIG. 11A, the electrically conductive contact pin 100 includes a body portion 110 and a tip portion 130. The body portion 110 includes a stacked portion 111 and a connecting portion 113. The tip portion 130 is connected to the connecting portion 113 of the body portion 110 and is provided in a cantilever shape The stacked portion 111 is formed by stacking a first metal 121 and a second metal 123, and the connecting portion 113 and the tip portion 130 are made of a first metal 121.

Preferably, the electrically conductive contact pin 100 includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of a palladium-cobalt (PdCo) alloy. The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 and the tip portion 130 are made of the first metal 121 made of a palladium-cobalt (PdCo) alloy, and are made of a single material of a palladium-cobalt (PdCo) alloy. The first metal 121 made of a palladium-cobalt (PdCo) alloy is formed in each of the stacked portion 111, the connecting portion 113, and the tip portion 130 to integrate them together. The tip portion 130 is made of the same material as the material of the connecting portion 113, and the connecting portion 113 is made of the same material as one of the metals constituting the stacked portion 111. With this, the tip portion 130 is firmly attached to the body portion 110

Referring to FIG. 11B, the electrically conductive contact pin 100 includes a body portion 110 and a tip portion 130. The body portion 110 includes a stacked portion 111 and a connecting portion 113. The tip portion 130 is connected to the connecting portion 113 of the body portion 110 and is provided in a cantilever shape. The stacked portion 111 is formed by stacking a first metal 121 and a second metal 123, and the connecting portion 113 and the tip portion 130 are made of a first metal 121

The electrically conductive contact pin 100 illustrated in FIG. 11B includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of rhodium (Rh). The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 is made of the first metal 121 made of a palladium-cobalt (PdCo) alloy, and is made of a single material of a palladium-cobalt (PdCo) alloy. The tip portion 130 is made of the first metal 121 made of rhodium (Rh), and is made of a single material of rhodium (Rh)

The tip portion 130 of the electrically conductive contact pin 100 is a part that is brought into contact with an object. With the configuration of the tip portion 130 made of the first metal 121 having high wear resistance or hardness, it is possible to improve the physical characteristics of the tip portion 130. In addition, by increasing the content of a metal having high wear resistance or high hardness in the tip portion 130 of the electrically conductive contact pin 100, the content of a metal having high electrical conductivity can be increased in the body portion 110 of the electrically conductive contact pin 100. Thus, it is possible to improve the overall current carrying capacity.

Second Embodiment

Next, a second embodiment according to the present disclosure will be described. However, the embodiments described below will be mainly described in terms of characteristic elements in comparison with the first embodiment, and descriptions of the same or similar elements to the first embodiment will be omitted.

Figure 12:
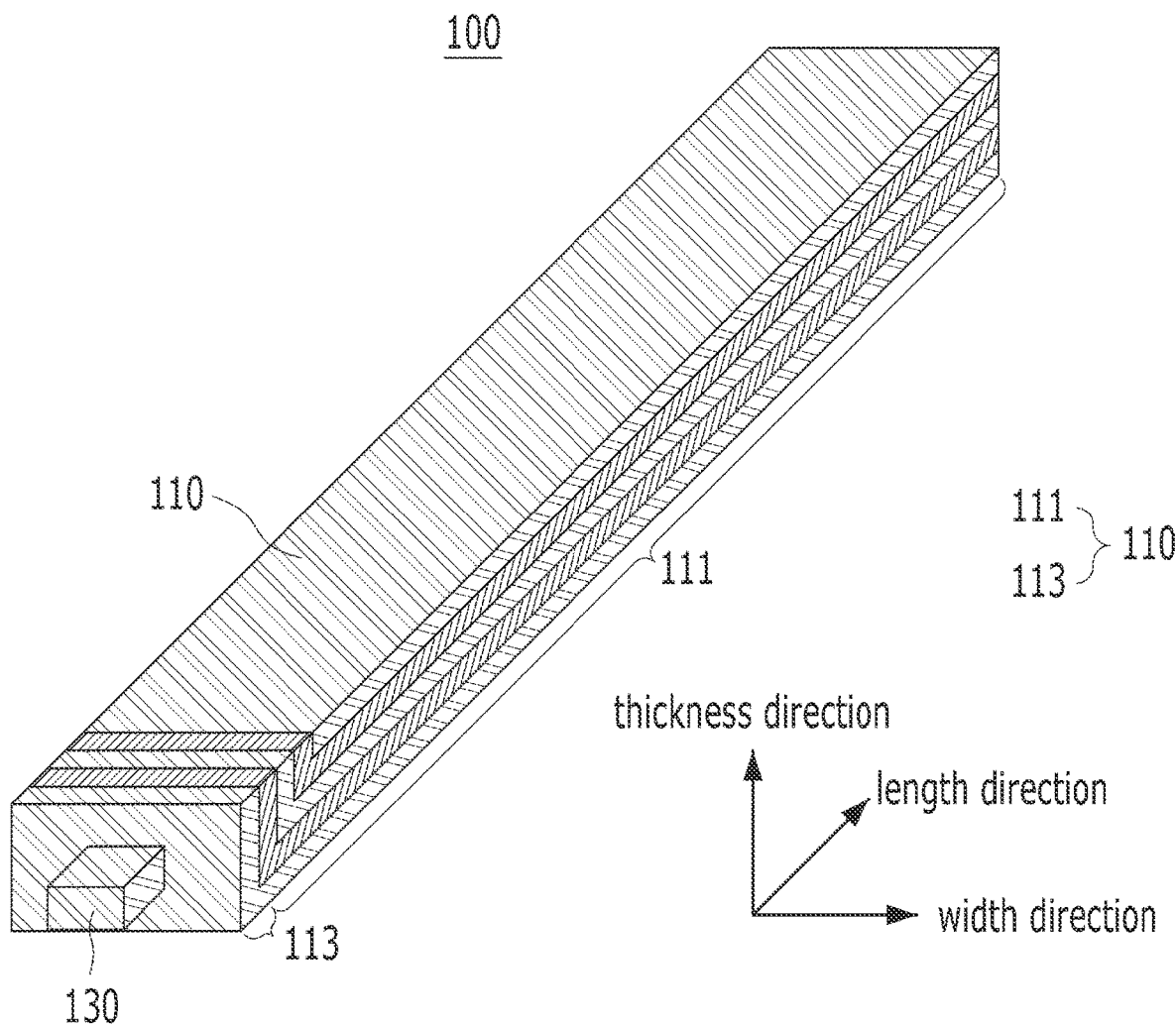
FIG. 12 is a view illustrating an electrically conductive contact pin according to a second embodiment of the present disclosure.
Figure 20A:
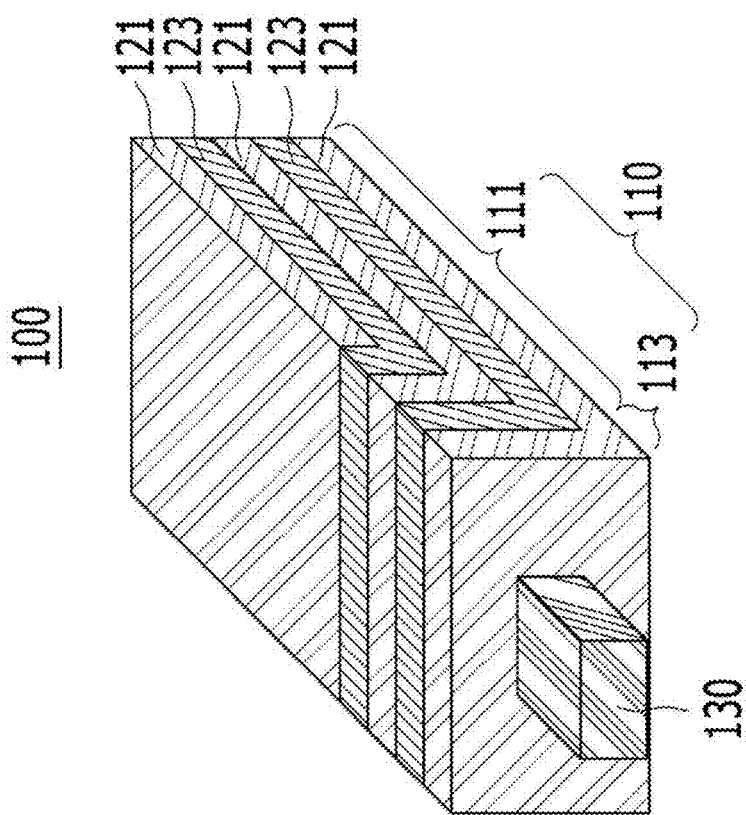
FIG. 20A is an enlarged view illustrating an end portion of an electrically conductive contact pin according to the second embodiment of the present disclosure, in which an example of a metal material configuration of the electrically conductive contact pin is illustrated
Figure 20B:
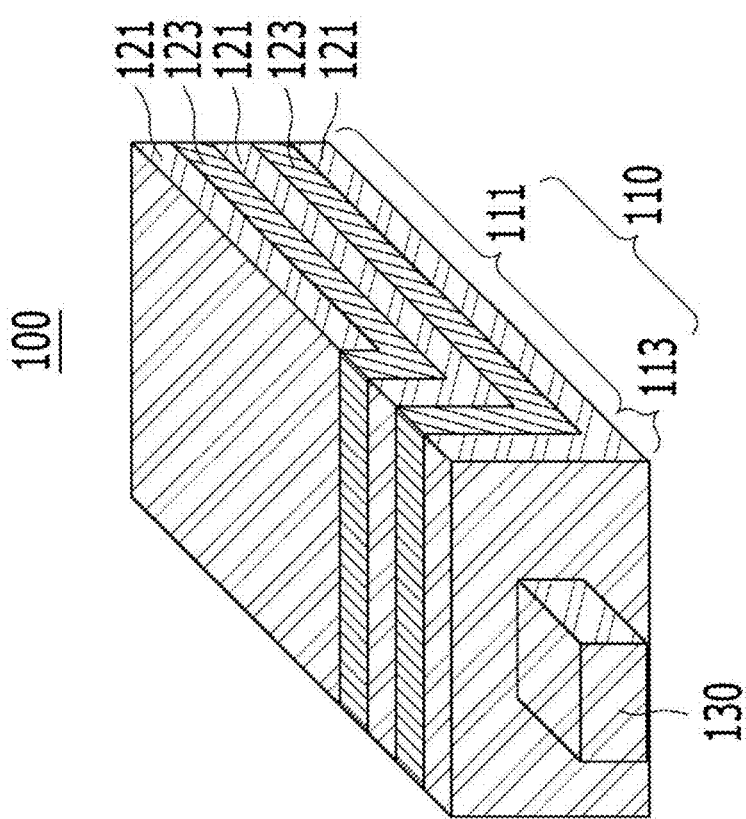
FIG. 20B is an enlarged view illustrating an end portion of an electrically conductive contact pin according to the second embodiment of the present disclosure, in which another example of a metal material configuration of the electrically conductive contact pin is illustrated

Hereinafter, an electrically conductive contact pin 100 according to the second embodiment of the present disclosure will be described with reference to FIGS. 12 to 20B. FIG. 12 is a view illustrating the electrically conductive contact pin 100 according to the second embodiment of the present disclosure. FIGS. 13A to 19D are views illustrating a manufacturing method for the electrically conductive contact pin 100 according to the second embodiment of the present disclosure. FIG. 20A is an enlarged view illustrating an end portion of an electrically conductive contact pin 100 according to the second embodiment of the present disclosure, in which an example of a metal material configuration of the electrically conductive contact pin is illustrated. FIG. 20B is an enlarged view illustrating an end portion of an electrically conductive contact pin 100 according to the second embodiment of the present disclosure, in which another example of a metal material configuration of the electrically conductive contact pin is illustrated In the electrically conductive contact pin 100 according to the second embodiment of the present disclosure, the configuration of a body portion 110 is different from that of the body portion 110 of the electrically conductive contact pin 100 according to the first embodiment.

Referring to FIG. 12 and FIGS. 20A and 20B, the body portion 110 of the electrically conductive contact pin 100 includes a stacked portion 111 formed by stacking a first metal 121 and a second metal 123. The stacked portion 111 is formed by stacking the first metal 121 and the second metal 123 in a "↔" shape when viewed from a side-surface side of an end portion of the body portion 110

The first metal 121 is a metal having relatively high wear resistance compared to the second metal 123, and may be selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy. The second metal 123 is a metal having relatively high electrical conductivity compared to the first metal 121, and may be selected from the group consisting of copper (Cu), silver (Ag), gold (Au), and an alloy of these metals The lowest layer of the stacked portion 111 is composed of the first metal 121. The first metal 121 of the lowest layer is formed to extend vertically from a lower surface to an upper surface of the electrically conductive contact pin 100 to form a connecting portion 113 provided between the tip portion 130 and the stacked portion 111. With the configuration of the first metal 121 having a "L" shape when viewed from the side-surface side of the end portion of the stacked portion 111, it is possible to prevent the connecting portion 113 from being damaged by shear failure. In addition, with the configuration of the second metal 121 having a "L" shape when viewed from the side-surface side of the end portion of the stacked portion 111, it is possible to significantly reduce the current resistance at the end portion. Since a "L" shaped vertical portion is provided at the end portion and the area of the "L" shaped vertical portion is large, the current resistance at the end portion of the electrically conductive contact pin 100 can be reduced.

Hereinafter, a manufacturing method for the electrically conductive contact pin 100 according to the second embodiment of the present disclosure will be described with reference to FIGS. 13A to 19D The manufacturing method for the electrically conductive contact pin 100 according to the second embodiment of the present disclosure, the electrically conductive contact pin 100 including a body portion 110 including a stacked portion 111 formed by stacking a plurality of metal layers and a tip portion 130 protruding from an end portion of the body portion 110, includes: forming each of the body portion 110 and the tip portion 130 by plating using a mold. This will be described in detail below.

First, referring to FIGS. 13A, 13B, 13C, and 13D, FIG. 13A is a plan view illustrating the mold 20 in which a first inner space 21 is formed, FIG. 13B is a sectional view taken along line A-A' of FIG. 13A, FIG. 13C is a sectional view taken along line B-B' of FIG. 13A, and FIG. 13D is a sectional view taken along line C-C' of FIG. 13A Referring to FIGS. 13A, 13B, 13C, and 13D, the first inner space 21 is formed in the mold 20, and a seed layer 30 is provided under the mold 20

The mold 20 may be made of an anodic aluminum oxide film, a photoresist, a silicon wafer, or a material similar thereto. However, a preferred material for the mold 20 is the anodic aluminum oxide film. The seed layer 30 is provided on a lower surface of the mold 20.

The first inner space 21 may be formed by wet-etching the mold 20 made of the anodic aluminum oxide film. To this end, a photoresist may be provided on the upper surface of the mold 20 and patterned, and then the anodic aluminum oxide film in a patterned and open area may react with an etchant to form the first inner space 21. In detail, after a photosensitive material is provided on the upper surface of the mold 20 in a state before the first inner space 21 is formed, exposure and development processes may be performed. At least a part of the photosensitive material may be patterned and removed to form an open area through the exposure and development processes. As a result of etching the mold 20 made of the anodic aluminum oxide film through the open area where the photosensitive material is removed by the patterning process, a part of the anodic aluminum oxide film at a position corresponding to the first inner space 21 is removed by the etchant to form the first inner space 21.

Next, referring to FIGS. 14A, 14B, 14C, and 14D, FIG. 14A is a plan view illustrating the mold 20 in which a temporary stacked portion 150 for forming the tip portion 130 is formed in the first inner space 21, FIG. 14B is a sectional view taken along line A-A' of FIG. 14A, FIG. 14C is a sectional view taken along line B-B' of FIG. 14A, and FIG. 14D is a sectional view taken along line C-C' of FIG. 14A The step of forming the temporary stacked portion 150 for forming the tip portion 130 in the first inner space 21 of the mold 20 by electroplating is performed. The temporary stacked portion 150 is formed by stacking a plurality of metal layers in the thickness direction of the electrically conductive contact pin 100 by performing electroplating a plurality of times. The temporary stacked portion 150 is formed by sequentially stacking a sacrificial layer 130, a first metal 121, and a sacrificial layer 130 from the bottom. The sacrificial layers 130 are made of a metal made of copper (Cu) and will be removed later by a copper etchant.

The first metal 121 is formed by setting the plating time so that the first metal 121 is located centrally in the thickness direction of the temporary stacked portion 150. With this, the temporary stacked portion 150 has a shape that is vertically symmetrical with respect to the center of the first metal 121.

After the plating process is completed, a planarization process may be performed. The metal protruding from the upper surface of the mold 20 is removed and planarized through a chemical mechanical polishing (CMP) process.

Next, referring to FIGS. 15A, 15B, 15C, and 15D, FIG. 15A is a plan view illustrating the mold 20 in which a second inner space 22 is formed, FIG. 15B is a sectional view taken along line A-A' of FIG. 15A, FIG. 15C is a sectional view taken along line B-B' of FIG. 15A, and FIG. 15D is a sectional view taken along line C-C' of FIG. 15A The step of removing a part of the mold 20 is performed. The second inner space 22 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the second inner space 22.

The second inner space 22 is formed to have a larger width than the temporary stacked portion 150. That is, the width of the temporary stacked portion 150 is smaller than that of the second inner space 22. In addition, the second inner space 22 is formed so that the central axis of the temporary stacked portion 150 in the length direction and the central axis of the second inner space 22 in the length direction are located on the same line.

The temporary stacked portion 150 is exposed through one side surface of the second inner space 22 and the mold 20 is exposed through the remaining side surfaces of the second inner space 22.

Figure 16C:
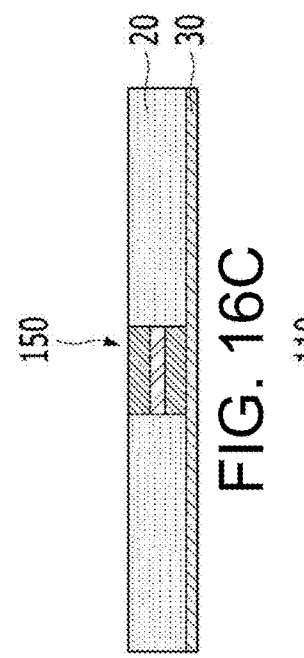
Figure 16D:
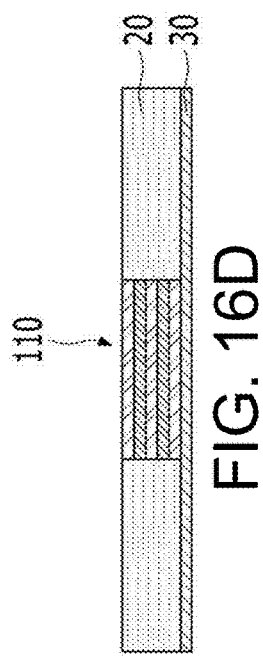
Figure 16A:
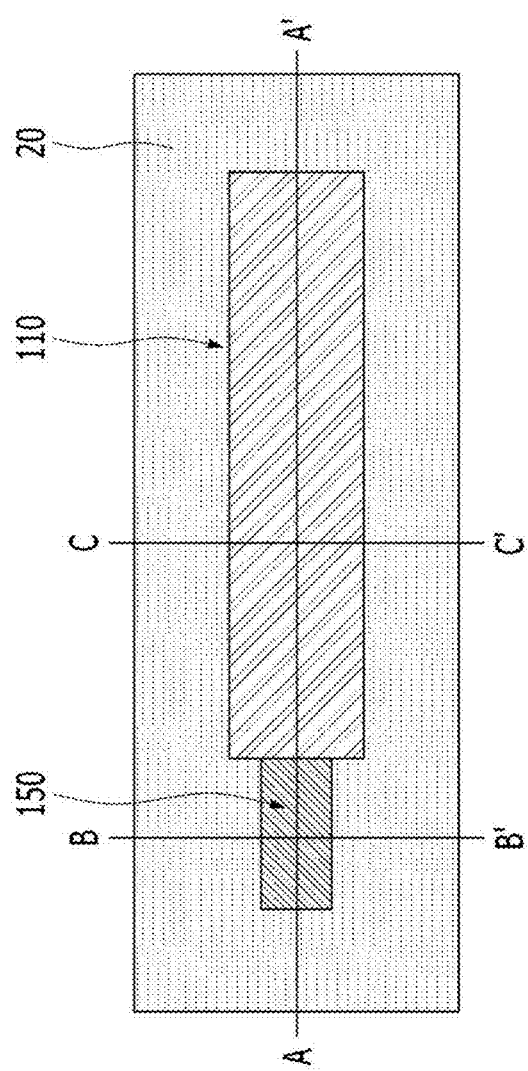
Figure 16B:
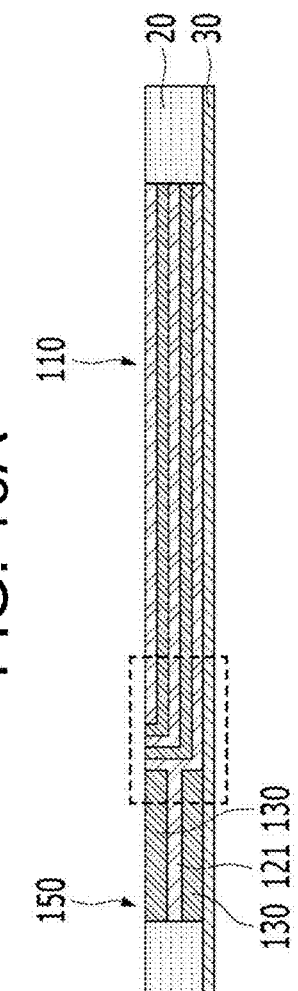
Figure 17:
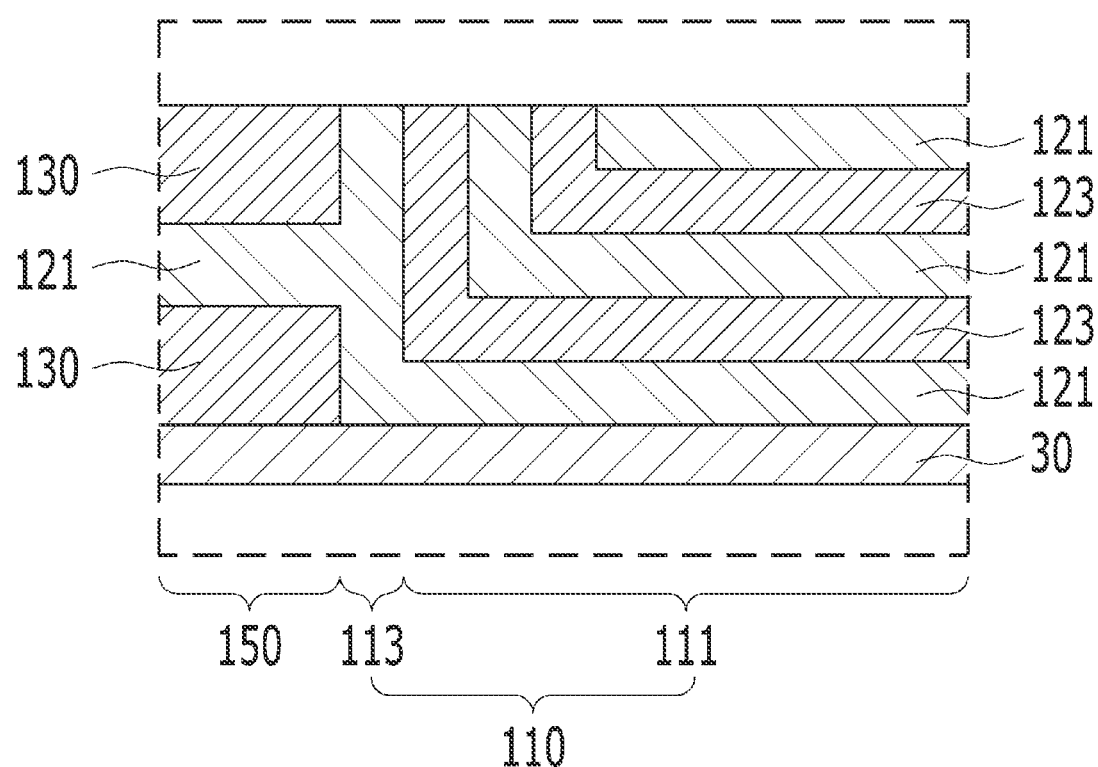

Next, referring to FIGS. 16A, 16B, 16C, and 16D and FIG. 17, FIG. 16A is a plan view illustrating the mold 20 in which the body portion 110 is formed in the second inner space 22, FIG. 16B is a sectional view taken along line A-A' of FIG. 16A, FIG. 16C is a sectional view taken along line B-B' of FIG. 16A, FIG. 16D is a sectional view taken along line C-C' of FIG. 5A, and FIG. 17 is an enlarged view illustrating a dotted box portion of FIG. 16B The step of forming the body portion 110 is performed. The body portion 110 is formed in the second inner space 22 formed in the previous step by electroplating. The body portion 110 includes the stacked portion 111 formed by stacking a plurality of metal layers in the vertical direction (thickness direction) and a connecting portion 113 connected to the temporary stacked portion 150.

The body portion 110 includes the stacked portion 111 formed by stacking a first metal 121 and a second metal 123. The stacked portion 111 is formed by stacking the first metal 121 and the second metal 123 in a "L" shape when viewed from a side-surface side of an end portion of the body portion 110.

The lowest layer of the stacked portion 111 is composed of the first metal 121. The first metal 121 of the lowest layer is formed to extend vertically from a lower surface to an upper surface of the electrically conductive contact pin 100 to form the connecting portion 113. The first metal 121 of the lowest layer functions as a barrier to prevent an etchant for removing the temporary stacked portion 150 from penetrating into the stacked portion 111.

Next, referring to FIGS. 18A, 18B, 18C, and 18D, FIG. 18A is a plan view illustrating the mold 20 in which a fourth inner space 24 is formed, FIG. 18B is a sectional view taken along line A-A' of FIG. 18A, FIG. 18C is a sectional view taken along line B-B' of FIG. 18A, and FIG. 18D is a sectional view taken along line C-C' of FIG. 18A The step of removing a part of the mold 20 is performed. The fourth inner space 24 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the fourth inner space 24.

The fourth inner space 24 is formed outside the temporary stacked portion 150 so that the sacrificial layers 130 of the temporary stacked portion 150 are exposed. Preferably, in order to effectively remove the sacrificial layers 130, the fourth inner space 24 is formed to surround the outside of the temporary stacked portion 150.

Then, an etchant that selectively reacts only with the sacrificial layers 130 is injected into the fourth inner space 24 to remove the sacrificial layers 130 of the temporary stacked portion 150. In the previous step, the temporary stacked portion 150 is provided by sequentially stacking the sacrificial layer 130, the first metal 121, and the sacrificial layer 130. Here, the sacrificial layers 130 provided on and under the first metal 121 are removed. With this, the tip portion 130 made of the first metal 121 has a first end connected to the connecting portion 113 and a second end serving as a free end, so that the tip portion 130 is connected to the connecting portion 113 in a cantilever shape.

When the sacrificial layers 130 are made of a metal made of copper (Cu), the etchant is a copper etchant that can selectively remove the metal made of copper (Cu). Here, since the connecting portion 113 is made of a metal selected from the materials of the first metal 121, it does not react with the copper etchant. As a result, the connecting portion 113 prevents the etchant from penetrating into the stacked portion 111, so that the second metal 123 constituting the stacked portion 111 and the copper etchant do not react with each other.

Next, referring to FIGS. 19A, 19B, 19C, and 19D, FIG. 19A is a plan view illustrating the electrically conductive contact pin 100, FIG. 19B is a sectional view taken along line A-A' of FIG. 19A, FIG. 19C is a sectional view taken along line B-B' of FIG. 19A, and FIG. 19D is a sectional view taken along line C-C' of FIG. 19A The step of removing the mold 20 and the seed layer 30 is performed after the previous step. When the mold 20 is made of the anodic aluminum oxide film, the mold 20 is removed using a solution that selectively reacts with the anodic aluminum oxide film. In addition, when the seed layer 30 is made of copper (Cu), the seed layer 30 is removed using a solution that selectively reacts with copper (Cu). The seed layer 30 may be removed with the copper etchant used to remove the sacrificial layers 130 in the previous step. However, when the sacrificial layers are exposed to the copper etchant for a long period of time to remove the seed layer 30, other parts may also be affected. Thus, it is preferable to remove the seed layer 30 through a separate process in this step.

In the previous description, it has been described that the temporary stacked portion 150 is formed first by plating the first inner space 21 using the mold 20 in which the first inner space 21 is formed, and then the body portion 110 is formed by forming the second inner space 22 by removing the part of the mold 20 and then plating the second inner space 22. However, the formation order is not limited thereto, and the temporary stacked portion and the body portion may be formed in the reverse order to the above.

FIG. 20A is an enlarged view illustrating an end portion of an electrically conductive contact pin 100 according to the second embodiment of the present disclosure, in which an example of a metal material configuration of the electrically conductive contact pin is illustrated. FIG. 20B is an enlarged view illustrating an end portion of an electrically conductive contact pin 100 according to the second embodiment of the present disclosure, in which another example of a metal material configuration of the electrically conductive contact pin is illustrated Referring to FIG. 20A, the electrically conductive contact pin 100 includes a body portion 110 and a tip portion 130. The body portion 110 includes a stacked portion 111 and a connecting portion 113. The tip portion 130 is connected to the connecting portion 113 of the body portion 110 and is provided in a cantilever shape The stacked portion 111 is formed by stacking a first metal 121 and a second metal 123, and the connecting portion 113 and the tip portion 130 are made of a first metal 121.

Preferably, the electrically conductive contact pin 100 includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of a palladium-cobalt (PdCo) alloy. The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 and the tip portion 130 are made of the first metal 121 made of a palladium-cobalt (PdCo) alloy, and are made of a single material of a palladium-cobalt (PdCo) alloy. The first metal 121 made of a palladium-cobalt (PdCo) alloy is formed in each of the stacked portion 111, the connecting portion 113, and the tip portion 130 to integrate them together. The tip portion 130 is made of the same material as the material of the connecting portion 113, and the connecting portion 113 is made of the same material as one of the metals constituting the stacked portion 111. With this, the tip portion 130 is firmly attached to the body portion 110

Referring to FIG. 20B, the electrically conductive contact pin 100 includes a body portion 110 and a tip portion 130. The body portion 110 includes a stacked portion 111 and a connecting portion 113. The tip portion 130 is connected to the connecting portion 113 of the body portion 110 and is provided in a cantilever shape. The stacked portion 111 is formed by stacking a first metal 121 and a second metal 123, and the connecting portion 113 and the tip portion 130 are made of a first metal 121

The electrically conductive contact pin 100 illustrated in FIG. 20B includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of rhodium (Rh). The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 is made of the first metal 121 made of a palladium-cobalt (PdCo) alloy, and is made of a single material of a palladium-cobalt (PdCo) alloy. The tip portion 130 is made of the first metal 121 made of rhodium (Rh), and is made of a single material of rhodium (Rh)

The tip portion 130 of the electrically conductive contact pin 100 is a part that is brought into contact with an object. With the configuration of the tip portion 130 made of the first metal 121 having high wear resistance or hardness, it is possible to improve the physical characteristics of the tip portion 130. In addition, by increasing the content of a metal having high wear resistance or high hardness in the tip portion 130 of the electrically conductive contact pin 100, the content of a metal having high electrical conductivity can be increased in the body portion 110 of the electrically conductive contact pin 100. Thus, it is possible to improve the overall current carrying capacity.

Third Embodiment

Next, a third embodiment according to the present disclosure will be described. However, the embodiments described below will be mainly described in terms of characteristic elements in comparison with the first embodiment, and descriptions of the same or similar elements to the first embodiment will be omitted.

Figure 21:
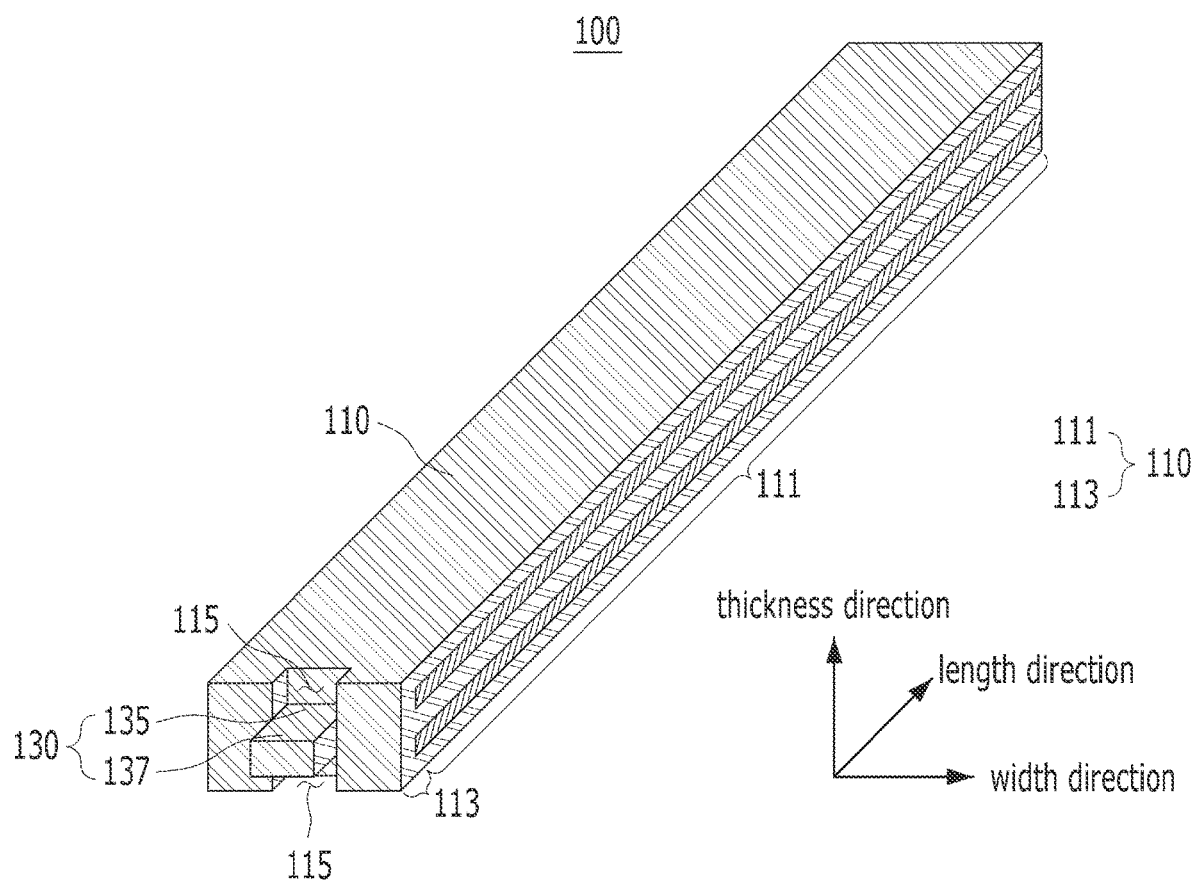
FIG. 21 is a view illustrating an electrically conductive contact pin according to a third embodiment of the present disclosure.

Hereinafter, an electrically conductive contact pin 100 according to the third embodiment of the present disclosure will be described with reference to FIGS. 21 to 31B. FIG. 21 is a view illustrating the electrically conductive contact pin 100 according to the third embodiment of the present disclosure. FIGS. 22A to 30E are views illustrating a manufacturing method for the electrically conductive contact pin 100 according to the third embodiment of the present disclosure. FIG. 31A is an enlarged view illustrating an end portion of an electrically conductive contact pin 100 according to the third embodiment of the present disclosure, in which an example of a metal material configuration of the electrically conductive contact pin is illustrated. FIG. 31B is an enlarged view illustrating an end portion of an electrically conductive contact pin 100 according to the third embodiment of the present disclosure, in which another example of a metal material configuration of the electrically conductive contact pin is illustrated In the electrically conductive contact pin 100 according to the third embodiment of the present disclosure, the configuration of a tip portion 130 and a connecting portion 113 is different from that of the tip portion 130 and the connecting portion 113 of the electrically conductive contact pin 100 according to the first embodiment Referring to FIG. 21 and FIGS. 31A and 31B, the electrically conductive contact pin 100 according to the third embodiment of the present disclosure includes a body portion 110 including a stacked portion 111 formed by stacking a plurality of metal layers in the vertical direction (thickness direction); and the tip portion 130 protruding from an end portion of the body portion 110

The tip portion 130 includes an inner portion 135 located inside the body portion 110 and an outer portion 137 located outside the body portion 110. The inner portion 135 is a part of the tip portion 130 located inside the body portion 110 with respect to the end portion of the body portion 110 without protruding outwardly from the end portion. The outer portion 137 is a part of the tip portion 130 located outside the body portion 110 with respect to the end portion of the body portion 110 by protruding outwardly from the end portion.

The body portion 110 (more specifically, the connecting portion 113) is provided on the left and right sides of the inner portion 135 with respect to the inner portion 135, and the body portion 110 is not provided on the upper and lower sides of the inner portion 135 with respect to the inner portion 135. The inner portion 135 is supported horizontally by the body portion 110 provided on the left and right sides of the inner portion 135, but the inner portion 135 is not supported vertically by the body portion 110. That is, a free space portion 115 in which the body portion 110 is not formed is provided on each of the upper and lower sides of the inner portion 135.

The connecting portion 113 formed at the end portion of the body portion 110 fixes the tip portion 130 on a lower surface of the inner portion 135 and opposite side surfaces of the inner portion 135.

Since the electrically conductive contact pin 100 the first metal 121, the direction in which the electrically conductive contact pin 100 is deformed by a pressing force corresponds to the direction in which side surfaces of the electrically conductive contact pin 100 approach or move away from each other. In this case, since the connecting portion 113 of the body portion 110 is provided on the left and right sides of the inner portion 135 of the tip portion 130, damage to the tip portion 130 can be effectively prevented.

In addition, with the configuration of the free space portion 115, recessed end surfaces are formed on the upper and lower sides of the tip portion 130. Thus, when aligning the position of the tip portion 130 by photographing the tip portion 130 with a vision camera, the position of the tip portion 130 can be aligned more precisely. More specifically, the free space portion 115 forms a recessed surface on an end surface of the electrically conductive contact pin 100, thereby enabling the vision camera to more precisely determine the position of the tip portion 130.

The first metal 121 is a metal having relatively high wear resistance compared to the second metal 123, and may be selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy. The second metal 123 is a metal having relatively high electrical conductivity compared to the first metal 121, and may be selected from the group consisting of copper (Cu), silver (Ag), gold (Au), and an alloy of these metals Hereinafter, a manufacturing method for the electrically conductive contact pin 100 according to the third embodiment of the present disclosure will be described with reference to FIGS. 22A to 30E The manufacturing method for the electrically conductive contact pin 100 according to the third embodiment of the present disclosure, the electrically conductive contact pin 100 including a body portion 110 including a stacked portion 111 formed by stacking a plurality of metal layers and a tip portion 130 protruding from an end portion of the body portion 110, includes: forming each of the body portion 110 and the tip portion 130 by plating using a mold. This will be described in detail below.

Figure 22A:
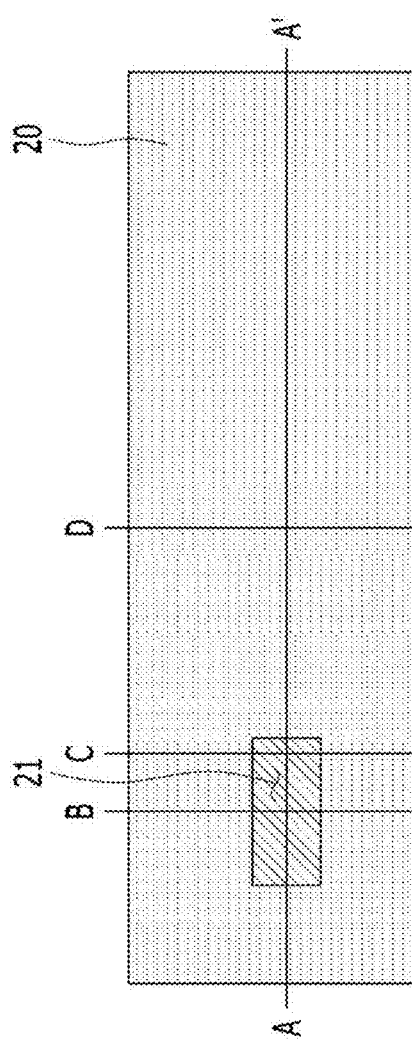
Figure 22B:
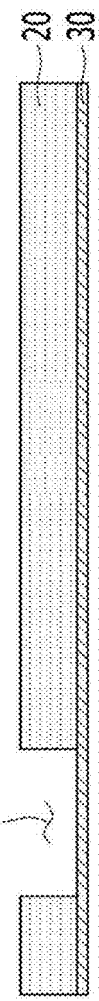
Figure 22C:
Figure 22D:
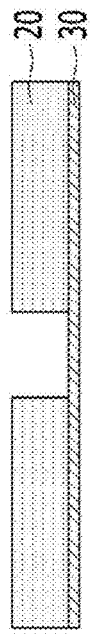
Figure 22E:
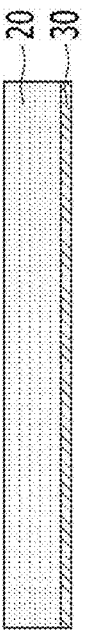

First, referring to FIGS. 22A, 22B, 22C, 22D, and 22E, FIG. 22A is a plan view illustrating the mold 20 in which a first inner space 21 is formed, FIG. 22B is a sectional view taken along line A-A' of FIG. 22A, FIG. 22C is a sectional view taken along line B-B' of FIG. 22A, FIG. 22D is a sectional view taken along line C-C' of FIG. 22A, and FIG. 22E is a sectional view taken along line D-D' of FIG. 22A Referring to FIGS. 22A, 22B, 22C, 22D, and 22E, the first inner space 21 is formed in the mold 20, and a seed layer 30 is provided under the mold 20

The mold 20 may be made of an anodic aluminum oxide film, a photoresist, a silicon wafer, or a material similar thereto. However, a preferred material for the mold 20 is the anodic aluminum oxide film.

The seed layer 30 is provided on a lower surface of the mold 20.

The first inner space 21 may be formed by wet-etching the mold 20 made of the anodic aluminum oxide film. To this end, a photoresist may be provided on the upper surface of the mold 20 and patterned, and then the anodic aluminum oxide film in a patterned and open area may react with an etchant to form the first inner space 21. In detail, after a photosensitive material is provided on the upper surface of the mold 20 in a state before the first inner space 21 is formed, exposure and development processes may be performed. At least a part of the photosensitive material may be patterned and removed to form an open area through the exposure and development processes. As a result of etching the mold 20 made of the anodic aluminum oxide film through the open area where the photosensitive material is removed by the patterning process, a part of the anodic aluminum oxide film at a position corresponding to the first inner space 21 is removed by the etchant to form the first inner space 21.

Next, referring to FIGS. 23A, 23B, 23C, 23D, and 23E, FIG. 23A is a plan view illustrating the mold 20 in which a temporary stacked portion 150 for forming the tip portion 130 is formed in the first inner space 21, FIG. 23B is a sectional view taken along line A-A' of FIG. 23A, FIG. 23C is a sectional view taken along line B-B' of FIG. 23A, FIG. 23D is a sectional view taken along line C-C' of FIG. 23A, and FIG. 23E is a sectional view taken along line D-D' of FIG. 23A The step of forming the temporary stacked portion 150 for forming the tip portion 130 in the first inner space 21 of the mold 20 by electroplating is performed. The temporary stacked portion 150 is formed by stacking a plurality of metal layers in the thickness direction of the electrically conductive contact pin 100 by performing electroplating a plurality of times. The temporary stacked portion 150 is formed by sequentially stacking a sacrificial layer 130, a first metal 121, and a sacrificial layer 130 from the bottom. The sacrificial layers 130 are made of a metal made of copper (Cu) and will be removed later by a copper etchant.

The first metal 121 is formed by setting the plating time so that the first metal 121 is located centrally in the thickness direction of the temporary stacked portion 150. With this, the temporary stacked portion 150 has a shape that is vertically symmetrical with respect to the center of the first metal 121.

After the plating process is completed, a planarization process may be performed. The metal protruding from the upper surface of the mold 20 is removed and planarized through a chemical mechanical polishing (CMP) process.

Figure 24A:
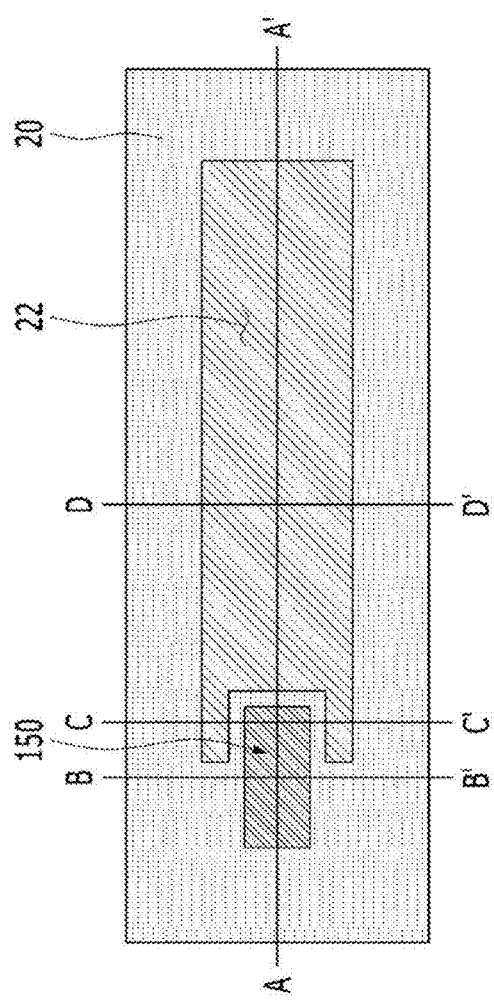
Figure 24B:
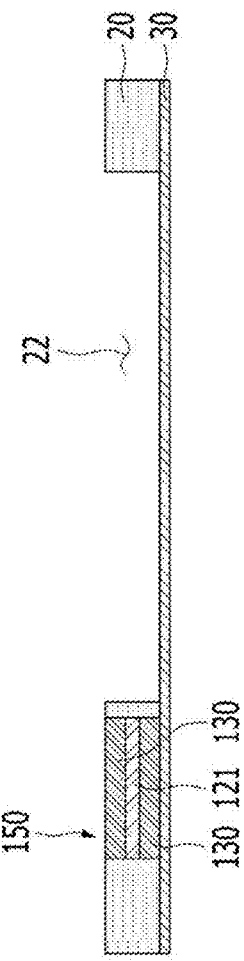
Figure 24C:
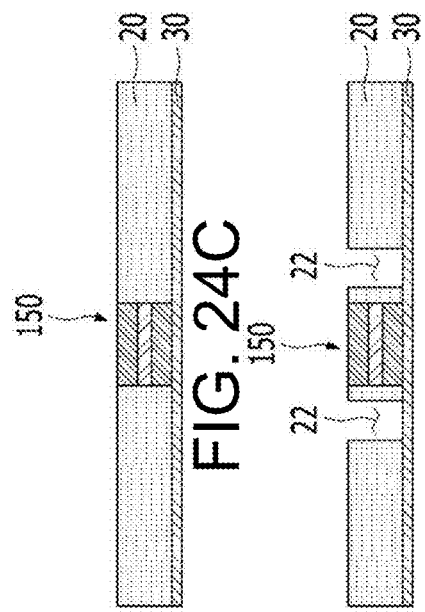
Figure 24D:
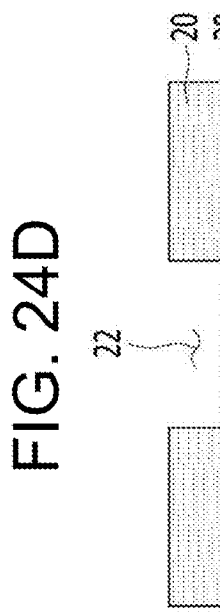
Figure 24E:
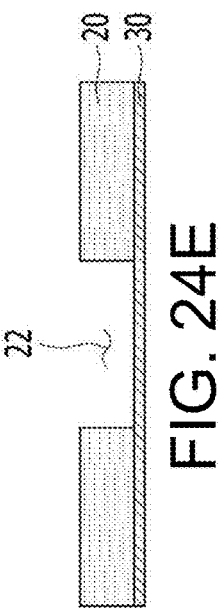

Next, referring to FIGS. 24A, 24B, 24C, 24D, and 24E, FIG. 24A is a plan view illustrating the mold 20 in which a second inner space 22 is formed, FIG. 24B is a sectional view taken along line A-A' of FIG. 24A, FIG. 24C is a sectional view taken along line B-B' of FIG. 24A, FIG. 24D is a sectional view taken along line C-C' of FIG. 24A, and FIG. 24E is a sectional view taken along line D-D' of FIG. 24A The step of removing a part of the mold 20 is performed. The second inner space 22 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the second inner space 22.

The second inner space 22 is formed to be spaced apart from the temporary stacked portion 150. The second inner space 22 is formed to have a larger width than the temporary stacked portion 150. That is, the width of the temporary stacked portion 150 is smaller than that of the second inner space 22. In addition, the second inner space 22 is formed so that the central axis of the temporary stacked portion 150 in the length direction and the central axis of the second inner space 22 in the length direction are located on the same line. The second inner space 22 includes an extended space extending from one side thereof so as to surround the outside of the temporary stacked portion 150. The extended space overlaps the temporary stacked portion 150 in the width direction.

Next, referring to FIGS. 25A, 25B, 25C, 25D, and 25E, FIG. 25A is a plan view illustrating the mold 20 in which the stacked portion 111 of the body portion 110 is formed in the second inner space 22, FIG. 25B is a sectional view taken along line A-A' of FIG. 25A, FIG. 25C is a sectional view taken along line B-B' of FIG. 25A, FIG. 25D is a sectional view taken along line C-C' of FIG. 25A, and FIG. 25E is a sectional view taken along line D-D' of FIG. 25A The step of forming the stacked portion 111 of the body portion 110 is performed. The stacked portion 111 of the body portion 110 is formed in the second inner space 22 formed in the previous step by electroplating.

The stacked portion 111 includes a first metal 121 and a second metal 123. The first metal 121 is plated first so that it is located in the lowest layer, and then the second metal 123 is stacked. As a result, the first metal 121 and the second metal 123 are alternately stacked, and the first metal 121 is formed in the lowest and uppermost layers.

Next, referring to FIGS. 26A, 26B, 26C, 26D, and 26E, FIG. 26A is a plan view illustrating the mold 20 in which a third inner space 23 is formed, FIG. 26B is a sectional view taken along line A-A' of FIG. 26A, FIG. 26C is a sectional view taken along line B-B' of FIG. 26A, FIG. 26D is a sectional view taken along line C-C' of FIG. 26A, and FIG. 26E is a sectional view taken along line D-D' of FIG. 26A The step of removing a part of the mold 20 is performed. The third inner space 23 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the third inner space 23.

The third inner space 23 is provided between the temporary stacked portion 150 and the stacked portion 111.

Next, referring to FIGS. 27A, 27B, 27C, 27D, and 27E, FIG. 27A is a plan view illustrating the mold 20 in which a connecting portion 113 is formed in third inner space 23, FIG. 27B is a sectional view taken along line A-A' of FIG. 27A, FIG. 27C is a sectional view taken along line B-B' of FIG. 27A, FIG. 27D is a sectional view taken along line C-C' of FIG. 27A, and FIG. 27E is a sectional view taken along line D-D' of FIG. 27 A The step of forming the connecting portion 113 of the body portion 110 is performed. The connecting portion 113 of the body portion 110 is formed in the third inner space 23 formed in the previous step by electroplating The connecting portion 113 is made of a first metal 121. The connecting portion 113 may be made of the first metal 121 made of a palladium-cobalt (PdCo) alloy or the first metal 121 made of rhodium (Rh)

Next, referring to FIGS. 28A, 28B, 28C, 28D, and 28E, FIG. 28A is a plan view illustrating the mold 20 in which a fourth inner space 24 is formed, FIG. 28B is a sectional view taken along line A-A' of FIG. 28A, FIG. 28C is a sectional view taken along line B-B' of FIG. 28A, FIG. 28D is a sectional view taken along line C-C' of FIG. 28A, and FIG. 28E is a sectional view taken along line D-D' of FIG. 28A The step of removing a part of the mold 20 is performed. The fourth inner space 24 is formed in the mold 20 by removing the part of the mold 20. In detail, after a photosensitive material is provided on the upper surface of the mold 20, exposure and development processes may be performed. At least a part of the photosensitive material may be patterned and removed to form an open area through the exposure and development processes. As a result of etching through the open area where the photosensitive material is removed by the patterning process, the part of the mold 20 is removed by an etchant to form the fourth inner space 24.

The fourth inner space 24 is formed outside the temporary stacked portion 150 so that the sacrificial layers 130 of the temporary stacked portion 150 are exposed. Preferably, in order to effectively remove the sacrificial layers 130, the fourth inner space 24 is formed to surround the outside of the temporary stacked portion 150.

Referring to FIGS. 29A, 29B, 29C, 29D, and 29E, FIG. 29A is a plan view illustrating the mold 20 in which the sacrificial layers 130 of the temporary stacked portion 150 are removed, FIG. 29B is a sectional view taken along line A-A' of FIG. 29A, FIG. 29C is a sectional view taken along line B-B' of FIG. 29A, FIG. 29D is a sectional view taken along line C-C' of FIG. 29A, and FIG. 29E is a sectional view taken along line D-D' of FIG. 29A An etchant that selectively reacts only with the sacrificial layers 130 is injected into the fourth inner space 24 to remove the sacrificial layers 130 of the temporary stacked portion 150. In the previous step, the temporary stacked portion 150 is provided by sequentially stacking the sacrificial layer 130, the first metal 121, and the sacrificial layer 130. Here, the sacrificial layers 130 provided on and under the first metal 121 are removed. With this, the tip portion 130 made of the first metal 121 has a first end connected to the connecting portion 113 and a second end serving as a free end, so that the tip portion 130 is connected to the connecting portion 113 in a cantilever shape.

When the sacrificial layers 130 are made of a metal made of copper (Cu), the etchant is a copper etchant that can selectively remove the metal made of copper (Cu). Here, since the connecting portion 113 is made of a metal selected from the materials of the first metal 121, it does not react with the copper etchant. As a result, the connecting portion 113 prevents the etchant from penetrating into the stacked portion 111, so that the second metal 123 constituting the stacked portion 111 and the copper etchant do not react with each other.

Figure 30A:
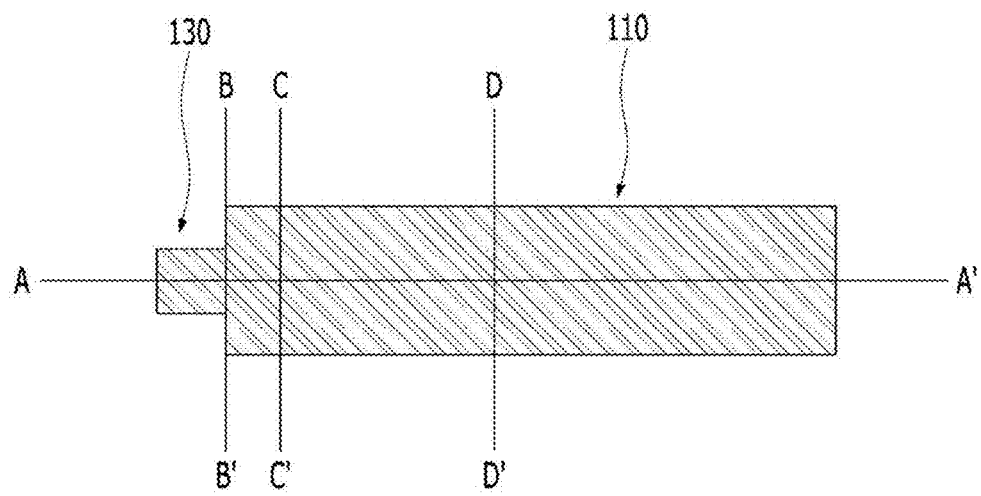
Figure 30B:
Figure 30C:
Figure 30D:
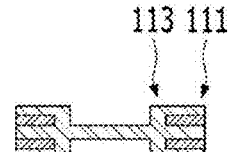
Figure 30E:
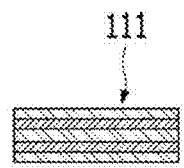
Figures 31A, 31B:
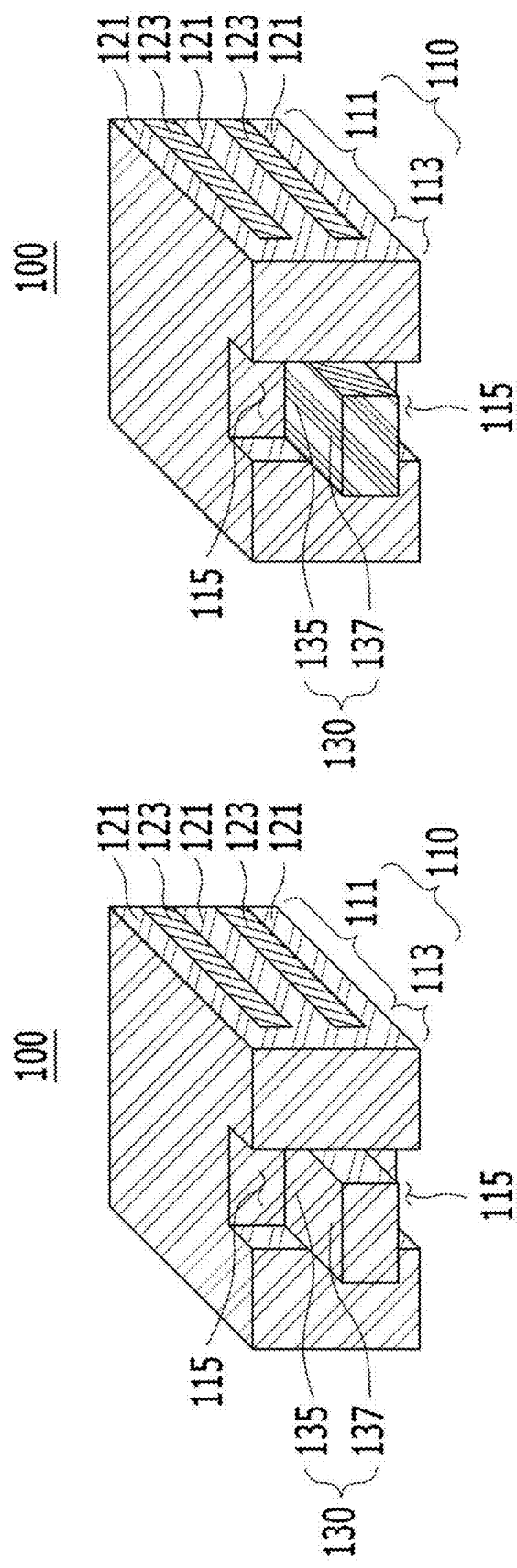
FIG. 31A is an enlarged view illustrating an end portion of an electrically conductive contact pin according to the third embodiment of the present disclosure, in which an example of a metal material configuration of the electrically conductive contact pin is illustrated
FIG. 31B is an enlarged view illustrating an end portion of an electrically conductive contact pin according to the third embodiment of the present disclosure, in which another example of a metal material configuration of the electrically conductive contact pin is illustrated

Next, referring to FIGS. 30A, 30B, 30C, 30D, and 30E, FIG. 30A is a plan view illustrating the electrically conductive contact pin 100, FIG. 30B is a sectional view taken along line A-A' of FIG. 30A, FIG. 30C is a sectional view taken along line B-B' of FIG. 30A, FIG. 30D is a sectional view taken along line C-C' of FIG. 30A, and FIG. 30E is a sectional view taken along line D-D' of FIG. 30A The step of removing the mold 20 and the seed layer 30 is performed after the previous step. When the mold 20 is made of the anodic aluminum oxide film, the mold 20 is removed using a solution that selectively reacts with the anodic aluminum oxide film. In addition, when the seed layer 30 is made of copper (Cu), the seed layer 30 is removed using a solution that selectively reacts with copper (Cu). The seed layer 30 may be removed with the copper etchant used to remove the sacrificial layers 130 in the previous step. However, when the sacrificial layers are exposed to the copper etchant for a long period of time to remove the seed layer 30, other parts may also be affected. Thus, it is preferable to remove the seed layer 30 through a separate process in this step.

In the previous description, it has been described that the temporary stacked portion 150 is formed first by plating the first inner space 21 using the mold 20 in which the first inner space 21 is formed, then the stacked portion 111 is formed by forming the second inner space 22 by removing the part of the mold 20 and then plating the second inner space 22, and finally the connecting portion 113 is formed by forming the third inner space 23 and plating the third inner space 23. However, the formation order is not limited thereto, and the temporary stacked portion 150, the stacked portion 111, and the connecting portion 113 may be formed in a different order from the above. However, even in this case, the metal constituting the connecting portion 113 has to be a metal that does not react with the etchant for removing the sacrificial layers 130 of the temporary stacked portion 150.

FIG. 31A is an enlarged view illustrating an end portion of an electrically conductive contact pin 100 according to the third embodiment of the present disclosure, in which an example of a metal material configuration of the electrically conductive contact pin is illustrated. FIG. 31B is an enlarged view illustrating an end portion of an electrically conductive contact pin 100 according to the third embodiment of the present disclosure, in which another example of a metal material configuration of the electrically conductive contact pin is illustrated Referring to FIG. 31A, the electrically conductive contact pin 100 includes a body portion 110 and a tip portion 130. The body portion 110 includes a stacked portion 111 and a connecting portion 113. The tip portion 130 is connected to the connecting portion 113 of the body portion 110 and is provided in a cantilever shape. In addition, the tip portion 130 is supported by the connecting portion 113 provided on the left and right sides thereof The stacked portion 111 is formed by stacking a first metal 121 and a second metal 123, and the connecting portion 113 and the tip portion 130 are made of a first metal 121.

Preferably, the electrically conductive contact pin 100 includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of a palladium-cobalt (PdCo) alloy. The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 and the tip portion 130 are made of the first metal 121 made of a palladium-cobalt (PdCo) alloy, and are made of a single material of a palladium-cobalt (PdCo) alloy. The first metal 121 made of a palladium-cobalt (PdCo) alloy is formed in each of the stacked portion 111, the connecting portion 113, and the tip portion 130 to integrate them together. The tip portion 130 is made of the same material as the material of the connecting portion 113, and the connecting portion 113 is made of the same material as one of the metals constituting the stacked portion 111. With this, the tip portion 130 is firmly attached to the body portion 110

Referring to FIG. 31B, the electrically conductive contact pin 100 includes a body portion 110 and a tip portion 130. The body portion 110 includes a stacked portion 111 and a connecting portion 113. The tip portion 130 is connected to the connecting portion 113 of the body portion 110 and is provided in a cantilever shape. The stacked portion 111 is formed by stacking a first metal 121 and a second metal 123, and the connecting portion 113 and the tip portion 130 are made of a first metal 121

The electrically conductive contact pin 100 illustrated in FIG. 31B includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of rhodium (Rh). The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 is made of the first metal 121 made of a palladium-cobalt (PdCo) alloy, and is made of a single material of a palladium-cobalt (PdCo) alloy. The tip portion 130 is made of the first metal 121 made of rhodium (Rh), and is made of a single material of rhodium (Rh)

The tip portion 130 of the electrically conductive contact pin 100 is a part that is brought into contact with an object. With the configuration of the tip portion 130 made of the first metal 121 having high wear resistance or hardness, it is possible to improve the physical characteristics of the tip portion 130. In addition, by increasing the content of a metal having high wear resistance or high hardness in the tip portion 130 of the electrically conductive contact pin 100, the content of a metal having high electrical conductivity can be increased in the body portion 110 of the electrically conductive contact pin 100. Thus, it is possible to improve the overall current carrying capacity.

Fourth Embodiment

Next, a fourth embodiment according to the present disclosure will be described. However, the embodiments described below will be mainly described in terms of characteristic elements in comparison with the third embodiment, and descriptions of the same or similar elements to the third embodiment will be omitted.

Figure 32A:
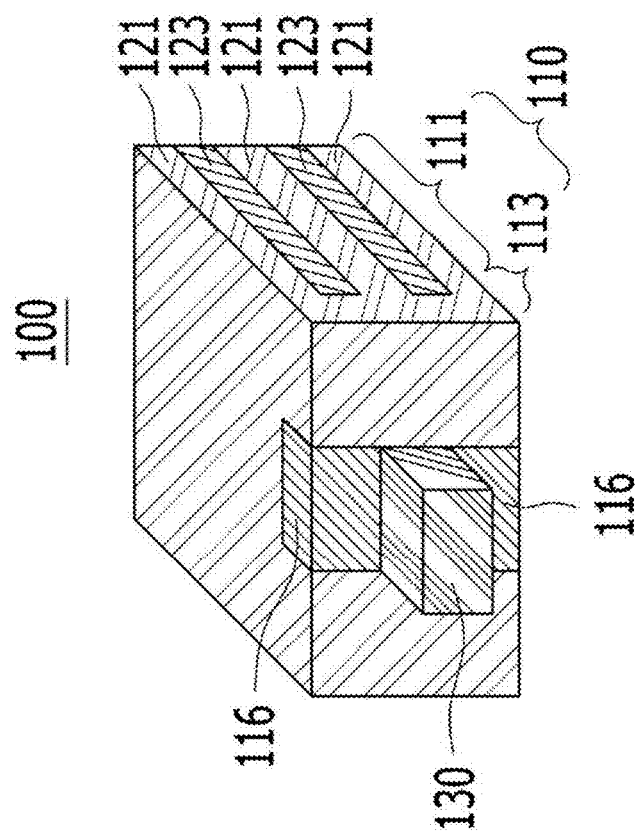
FIG. 32A is an enlarged view illustrating an end portion of an electrically conductive contact pin according to the fourth embodiment of the present disclosure, in which an example of a metal material configuration of the electrically conductive contact pin is illustrated

Hereinafter, an electrically conductive contact pin 100 according to the fourth embodiment of the present disclosure will be described with reference to FIGS. 32A and 32B. FIG. 32A is an enlarged view illustrating an end portion of an electrically conductive contact pin 100 according to the fourth embodiment of the present disclosure, in which an example of a metal material configuration of the electrically conductive contact pin is illustrated. FIG. 31B is an enlarged view illustrating an end portion of an electrically conductive contact pin 100 according to the fourth embodiment of the present disclosure, in which another example of a metal material configuration of the electrically conductive contact pin is illustrated In the electrically conductive contact pin 100 according to the fourth embodiment of the present disclosure, the configuration of a body portion is different from that of the body portion 110 of the electrically conductive contact pin 100 according to the third embodiment in that a reinforcing portion 116 is provided in a free space portion 115.

The electrically conductive contact pin 100 according to the fourth embodiment of the present disclosure includes a body portion 110 including a stacked portion 111 formed by stacking a plurality of metal layers in the vertical direction (thickness direction); and a tip portion 130 protruding from an end portion of the body portion 110.

The tip portion 130 includes an inner portion 135 located inside the body portion 110 and an outer portion 137 located outside the body portion 110. The inner portion 135 is located inside the body portion 110 with respect to the end portion of the body portion 110. The outer portion 137 is located outside the body portion 110 with respect to the end portion of the body portion 110.

The body portion 110 is provided on the left and right sides of the inner portion 135 with respect to the inner portion 135, and the reinforcing portion 116 is provided on each of the upper and lower sides of the inner portion 135 with respect to the inner portion 135. The body portion 110 provided on the left and right sides of the inner portion 135 is made of a first metal 121, and the reinforcing portion 116 provided on each of the upper and lower sides of the inner portion 135 is made of a second metal 123. The reinforcing portion 116 may be made of a material different from the material of the tip portion 130. In addition, the reinforcing portion 116 may be made of a material different from the material of the connecting portion 113.

The first metal 121 may be selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy. The second metal 123 may be selected from the group consisting of copper (Cu), silver (Ag), gold (Au), and an alloy of these metals Preferably, the electrically conductive contact pin 100 includes the stacked portion 111 formed by stacking the first metal 121 made of a palladium (palladium-cobalt, PdCo) alloy and the second metal 123 made of copper (Cu); the connecting portion 113 made of the first metal 121 made of a palladium-cobalt (PdCo) alloy; and the tip portion 130 made of the first metal 121 made of a palladium-cobalt (PdCo) alloy. The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer The first metal 121 made of a palladium-cobalt (PdCo) alloy is formed in each of the stacked portion 111, the connecting portion 113, and the tip portion 130 to integrate them together. The tip portion 130 is made of the same material as the material of the connecting portion 113, and the connecting portion 113 is made of the same material as one of the metals constituting the stacked portion 111. With this, the tip portion 130 is firmly attached to the body portion 110.

Here, the reinforcing portion 116 is made of the first metal 121 or the second metal 123 depending on the desired functionality of the reinforcing portion 116.

Preferably, the reinforcing portion 116 is made of the second metal 123. With the configuration in which the tip portion 130 of the electrically conductive contact pin 100 includes the inner portion 135 provided inside the body portion 110, a metal having high wear resistance or hardness is located on the left and right sides of the inner portion 135, and the reinforcing portion 116 made of a metal having high electrical conductivity is located on the upper and lower sides of the inner portion 135, it is possible to effectively prevent damage to the tip portion 130 and improve the current carrying capacity.

Figure 32B:
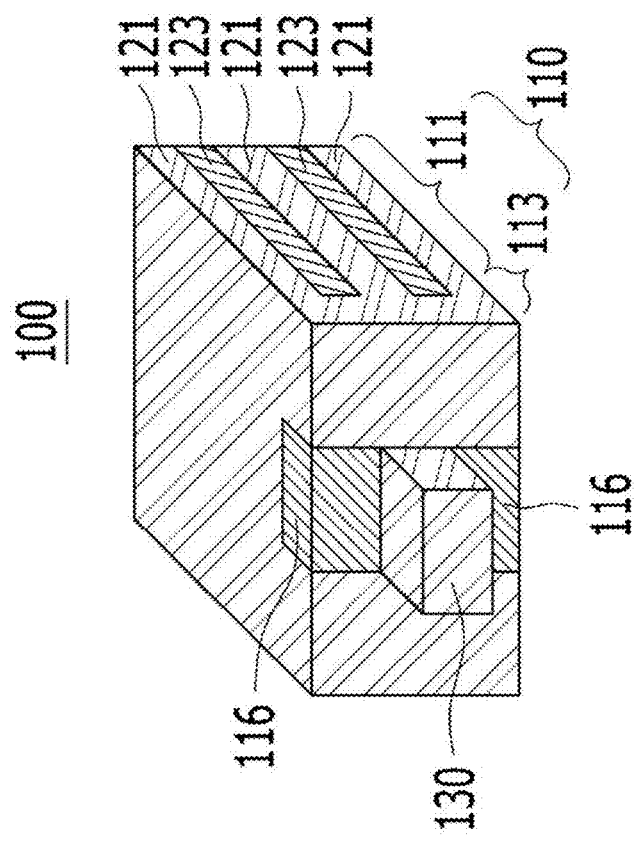
FIG. 32B is an enlarged view illustrating an end portion of an electrically conductive contact pin according to the fourth embodiment of the present disclosure, in which another example of a metal material configuration of the electrically conductive contact pin is illustrated

The electrically conductive contact pin 100 illustrated in FIG. 32B is different from the electrically conductive contact pin 100 illustrated in FIG. 32A in that a tip portion 130 including an inner portion 135 and an outer portion 137 is made of a first metal 121 made of rhodium (Rh)

That is, the electrically conductive contact pin 100 illustrated in FIG. 32B includes a stacked portion 111 formed by stacking a first metal 121 made of a palladium (palladium-cobalt, PdCo) alloy and a second metal 123 made of copper (Cu); a connecting portion 113 made of a first metal 121 made of a palladium-cobalt (PdCo) alloy; and the tip portion 130 made of a first metal 121 made of rhodium (Rh). The stacked portion 111 is formed by sequentially stacking the first metal 121 made of a palladium-cobalt (PdCo) alloy, the second metal 123 made of copper (Cu), the first metal 121 made of a palladium-cobalt (PdCo) alloy, the second metal 123 made of copper (Cu), and the first metal 121 made of a palladium-cobalt (PdCo) alloy in the thickness direction from the lowest layer. The connecting portion 113 is made of the first metal 121 made of a palladium-cobalt (PdCo) alloy, and is made of a single material of a palladium-cobalt (PdCo) alloy. The tip portion 130 is made of the first metal 121 made of rhodium (Rh), and is made of a single material of rhodium (Rh)

In the above-described embodiments, the tip portion 130 is provided at least one end portion of the electrically conductive contact pin 100. However, the present disclosure is not limited thereto, the tip portion 130 may be provided at one end portion of the electrically conductive contact pin 100 or the tip portion 130 may be provided at each end portion of the electrically conductive contact pin 100.

In the configuration in which the tip portion 130 is provided at each end portion of the electrically conductive contact pin 100, the tip portion 130 provided at a first end portion of the electrically conductive contact pin may be made of a metal having higher wear resistance or hardness than the average wear resistance or hardness of the stacked portion 111 of the body portion 110, and the tip portion provided at a second end portion of the electrically conductive contact pin may be made of a metal having a higher electrical conductivity than the average electrical conductivity of the stacked portion 111 of the body portion 110. For example, the tip portion 130 provided at the first end portion may be made of the first metal 121, and the tip portion 130 provided at the second end portion may be made of the second metal 123.

A plating film made of gold (Au) may be additionally formed on a surface of each of the electrically conductive contact pins 100 according to the above-described embodiments to further improve the current carrying capacity.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

DESCRIPTION OF THE REFERENCE
NUMERALS IN THE DRAWINGS

100: electrically conductive contact pin
110: body portion
130: tip portion

The invention claimed is:

1. An electrically conductive contact pin, comprising:
a body portion comprising a stacked portion formed by stacking a plurality of metal layers; and
a tip portion protruding from at least one end portion of the body portion and having a smaller cross-sectional area than the body portion;
a connecting portion provided in the body portion between the stacked portion and the tip portion,
wherein the stacked portion comprises a first metal and a second metal, wherein the first metal is a metal having relatively high wear resistance compared to the second metal and the second metal is a metal having relatively high electrical conductivity compared to the first metal,
the stacked portion is formed by alternately stacking the first metal and the second metal in a thickness direction, and
the connecting portion is formed of a metal layer made of a single material.

2. The electrically conductive contact pin of claim 1, wherein an upper surface of the tip portion is spaced apart from a plane extending from an upper surface of the body portion,
a lower surface of the tip portion is spaced apart from a plane extending from a lower surface of the body portion,
a first side surface of the tip portion is spaced apart from a plane extending from a first side surface of the body portion, and
a second side surface of the tip portion is spaced apart from a plane extending from a second side surface of the body portion.

3. The electrically conductive contact pin of claim 1, wherein a central axis of the tip portion and a central axis of the end portion of the body portion are located on the same line.

4. The electrically conductive contact pin of claim 1, wherein the tip portion is made of a single material.

5. The electrically conductive contact pin of claim 4, wherein the first metal is made of at least one metal selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy, and
the second metal is made of at least one metal selected from the group consisting of copper (Cu), silver (Ag), gold (Au), and an alloy of these metals.

6. The electrically conductive contact pin of claim 1, wherein
the tip portion is made of a metal having relatively high wear resistance compared to the second metal.

7. The electrically conductive contact pin of claim 1, wherein the tip portion comprises an inner portion located inside the body portion and an outer portion located outside the body portion.

8. The electrically conductive contact pin of claim 7, wherein the body portion is provided on left and right sides of the inner portion with respect to the inner portion, and a free space portion in which the body portion is not provided is formed on each of upper and lower sides of the inner portion with respect to the inner portion.

9. The electrically conductive contact pin of claim 7, wherein the body portion is provided on left and right sides of the inner portion with respect to the inner portion, and
a reinforcing portion made of a material different from a material of the tip portion is formed on each of upper and lower sides of the inner portion with respect to the inner portion.

10. The electrically conductive contact pin of claim 7, wherein a metal formed on left and right sides of the inner portion with respect to the inner portion and a metal formed on upper and lower sides of the inner portion are made of different materials.

11. An electrically conductive contact pin, comprising:
a body portion comprising a stacked portion formed by stacking a plurality of metal layers;
wherein the stacked portion comprises a first metal and a second metal, wherein the first metal is a metal having relatively high wear resistance compared to the second metal and the second metal is a metal having relatively high electrical conductivity compared to the first metal,
the stacked portion is formed by alternately stacking the first metal and the second metal in a thickness direction,
a tip portion formed by a metal layer made of a single material and protruding from an end portion of the body portion; and
a connecting portion provided in the body portion between the stacked portion and the tip portion,
wherein the tip portion is made of a metal selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy, and
the connecting portion is made of a metal selected from the group consisting of rhodium (Rh), platinum (Pt), iridium (Ir), palladium, and an alloy of these metals; the group consisting of a palladium-cobalt (PdCo) alloy and a palladium-nickel (PdNi) alloy; or the group consisting of a nickel-phosphor (NiPh) alloy, a nickel-manganese (NiMn), a nickel-cobalt (NiCo), and a nickel-tungsten (NiW) alloy.

12. A method for manufacturing an electrically conductive contact pin, the electrically conductive contact pin comprising a body portion comprising a stacked portion formed by stacking a plurality of metal layers and a tip portion protruding from an end portion of the body portion, the method comprising:
forming each of the body portion and the tip portion by plating using a mold;
providing a connecting portion in the body portion between the stacked portion and the tip portion;
wherein the stacked portion comprises a first metal and a second metal, wherein the first metal is a metal having relatively high wear resistance compared to the second metal and the second metal is a metal having relatively high electrical conductivity compared to the first metal,
the stacked portion is formed by alternately stacking the first metal and the second metal in a thickness direction, and
the connecting portion is formed of a metal layer made of a single material.

13. The method of claim 12, wherein the mold is made of an anodic aluminum oxide film.

* * * * *